(12) United States Patent
Lidgett et al.

(10) Patent No.: US 12,351,218 B2
(45) Date of Patent: Jul. 8, 2025

(54) DISCHARGE GATE SENSING METHOD, SYSTEM AND ASSEMBLY

(71) Applicant: Amsted Rail Company, Inc., Chicago, IL (US)

(72) Inventors: Justin M. Lidgett, Burleson, TX (US); Andrew H. Martin, West Chester, PA (US)

(73) Assignee: Amsted Rail Company, Inc., Chicago, IL (US)

( * ) Notice: Subject to any disclaimer, the term of this patent is extended or adjusted under 35 U.S.C. 154(b) by 930 days.

(21) Appl. No.: 17/508,528

(22) Filed: Oct. 22, 2021

(65) Prior Publication Data
US 2022/0135093 A1 May 5, 2022

Related U.S. Application Data

(63) Continuation of application No. 16/256,772, filed on Jan. 24, 2019, now Pat. No. 11,180,170.
(Continued)

(51) Int. Cl.
*B61L 15/00* (2006.01)
*B61D 7/02* (2006.01)
*B61L 25/02* (2006.01)

(52) U.S. Cl.
CPC ............ *B61L 15/0072* (2013.01); *B61D 7/02* (2013.01); *B61L 15/0027* (2013.01);
(Continued)

(58) Field of Classification Search
CPC ............ B61L 15/0072; B61L 15/0027; B61L 15/0081; B61L 25/025; B61L 2205/04; B61D 7/02
See application file for complete search history.

(56) References Cited

U.S. PATENT DOCUMENTS

| | | | |
|---|---|---|---|
| 3,718,040 A | 2/1973 | Freeman et al. | |
| 3,854,417 A | 12/1974 | MacDonnell et al. | |

(Continued)

FOREIGN PATENT DOCUMENTS

| | | |
|---|---|---|
| BR | PI0709492 | 7/2011 |
| BR | PI0709515 | 7/2011 |

(Continued)

OTHER PUBLICATIONS

Printout of web pages found at http://lat-lon.com/ Available on the Internet at least as early as Sep. 23, 2013.
(Continued)

*Primary Examiner* — Jason C Smith
(74) *Attorney, Agent, or Firm* — Fox Rothschild LLP; Carol E. Thorstad-Forsyth

(57) ABSTRACT

A system, method and assembly for detecting the operational status of one or more discharge gates on one or more railcars. The system and method monitor parameters that include whether the discharge gate is open or closed, whether the railcar is in motion or not, and whether the railcar is in a location where it is acceptable for the discharge gate to be open. Sensors carry out the monitoring, and the information obtained by monitoring the parameters are used to determine if a notification event has taken place and if so, a notification of such event can be transmitted to a remote receiver. A change in the status of any one of the monitored parameters can trigger the determination of whether a notification event has occurred.

10 Claims, 17 Drawing Sheets

Related U.S. Application Data

(60) Provisional application No. 62/621,212, filed on Jan. 24, 2018.

(52) U.S. Cl.
CPC ......... *B61L 15/0081* (2013.01); *B61L 25/025* (2013.01); *B61L 2205/04* (2013.01)

(56) References Cited

U.S. PATENT DOCUMENTS

| | | | |
|---|---|---|---|
| 3,859,619 A | 1/1975 | Ishihara et al. | |
| 3,896,280 A | 7/1975 | Blake | |
| 4,042,813 A | 8/1977 | Johnson | |
| 4,134,464 A | 1/1979 | Johnson et al. | |
| 4,296,707 A | 10/1981 | Kennedy | |
| 4,368,927 A | 1/1983 | Billingsley et al. | |
| 4,487,060 A | 12/1984 | Pomeroy | |
| 4,503,705 A | 3/1985 | Polchaninoff | |
| 4,801,288 A | 1/1989 | Schmitt et al. | |
| 4,812,826 A | 3/1989 | Kaufman et al. | |
| 4,859,000 A | 8/1989 | Deno et al. | |
| 4,905,795 A | 3/1990 | Rains | |
| 4,934,877 A | 6/1990 | Haverick et al. | |
| 4,946,229 A | 8/1990 | Deno et al. | |
| 4,977,577 A | 12/1990 | Arthur et al. | |
| 5,038,605 A | 8/1991 | Tews et al. | |
| 5,140,849 A | 8/1992 | Fujita et al. | |
| 5,347,871 A | 9/1994 | D'Andrea et al. | |
| 5,372,435 A | 12/1994 | Genero et al. | |
| 5,381,090 A | 1/1995 | Adler et al. | |
| 5,381,692 A | 1/1995 | Winslow et al. | |
| 5,394,137 A | 2/1995 | Orschek | |
| 5,440,184 A | 8/1995 | Samy et al. | |
| 5,446,451 A | 8/1995 | Grosskopf, Jr. | |
| 5,503,030 A | 4/1996 | Bankestrom | |
| 5,603,556 A | 2/1997 | Klink | |
| 5,633,628 A | 5/1997 | Denny et al. | |
| 5,642,944 A | 7/1997 | Dublin, Jr. et al. | |
| 5,682,139 A | 10/1997 | Pradeep et al. | |
| 5,691,980 A | 11/1997 | Welles, II et al. | |
| 5,701,974 A | 12/1997 | Kanjo et al. | |
| 5,810,485 A | 9/1998 | Dublin, Jr. et al. | |
| 5,986,547 A | 11/1999 | Korver et al. | |
| 6,006,868 A | 12/1999 | Klink | |
| 6,014,600 A | 1/2000 | Ferri et al. | |
| 6,127,672 A | 10/2000 | Danisch | |
| 6,161,962 A | 12/2000 | French et al. | |
| 6,170,619 B1 | 1/2001 | Sheriff et al. | |
| 6,175,784 B1 | 1/2001 | Jicha et al. | |
| 6,179,471 B1 | 1/2001 | Moretti et al. | |
| 6,184,798 B1 | 2/2001 | Egri | |
| 6,195,600 B1 | 2/2001 | Kettle, Jr. | |
| 6,237,722 B1 | 5/2001 | Hammond et al. | |
| 6,263,265 B1 | 7/2001 | Fera | |
| 6,301,531 B1 | 10/2001 | Pierro et al. | |
| 6,324,899 B1 | 12/2001 | Discenzo | |
| 6,339,397 B1 | 1/2002 | Baker | |
| 6,397,978 B1 | 6/2002 | Jackson et al. | |
| 6,441,324 B1 | 8/2002 | Stimpson | |
| 6,474,450 B1 | 11/2002 | Ring et al. | |
| 6,474,451 B1 | 11/2002 | O'Brien, Jr. | |
| 6,487,478 B1 | 11/2002 | Azzaro et al. | |
| 6,535,135 B1 | 3/2003 | French et al. | |
| 6,668,216 B2 | 12/2003 | Mays | |
| 6,695,483 B2 | 2/2004 | Sakatani et al. | |
| 6,739,675 B1 | 5/2004 | Scharpf et al. | |
| 6,823,242 B1 | 11/2004 | Ralph | |
| 6,882,851 B2 | 4/2005 | Sugar et al. | |
| 6,945,098 B2 | 9/2005 | Olson | |
| 6,948,856 B2 | 9/2005 | Takizawa et al. | |
| 6,957,801 B2 * | 10/2005 | Wilfert | F16K 31/046 137/554 |
| 7,014,368 B2 | 3/2006 | Morita et al. | |
| 7,018,106 B2 | 3/2006 | Okada | |
| 7,034,660 B2 | 4/2006 | Watters et al. | |
| 7,114,596 B2 | 10/2006 | Borugian | |
| 7,180,019 B1 | 2/2007 | Chiou et al. | |
| RE40,099 E | 2/2008 | Stephens et al. | |
| 7,336,156 B2 | 2/2008 | Arita et al. | |
| 7,538,672 B2 | 5/2009 | Lockyer et al. | |
| 7,657,349 B2 | 2/2010 | Hawthorne | |
| 7,688,218 B2 | 3/2010 | LeFebvre et al. | |
| 7,698,962 B2 | 4/2010 | LeFebvre et al. | |
| 7,705,743 B2 | 4/2010 | Barone et al. | |
| 8,033,236 B2 | 10/2011 | Michel et al. | |
| 8,060,264 B2 | 11/2011 | Oestermeyer et al. | |
| 8,212,685 B2 | 7/2012 | LeFebvre et al. | |
| 8,244,411 B2 | 8/2012 | Baker | |
| 8,370,006 B2 | 2/2013 | Kumar et al. | |
| 8,560,151 B2 | 10/2013 | Armitage et al. | |
| 8,672,273 B2 | 3/2014 | Brown et al. | |
| 8,751,290 B2 | 6/2014 | Schullian et al. | |
| 8,763,637 B2 | 7/2014 | Soldo et al. | |
| 8,820,685 B2 | 9/2014 | Michaut | |
| 8,823,537 B2 | 9/2014 | LeFebvre et al. | |
| 8,967,196 B2 * | 3/2015 | Ha | F16K 37/0041 137/554 |
| 9,026,281 B2 | 5/2015 | Murphy et al. | |
| 9,365,223 B2 | 6/2016 | Martin et al. | |
| 9,562,623 B2 * | 2/2017 | Clark | F16K 37/0041 |
| 9,574,680 B2 * | 2/2017 | Burlage | F16K 17/20 |
| 9,592,815 B2 * | 3/2017 | Wright | B60T 13/665 |
| 9,663,092 B2 * | 5/2017 | Martin | B60T 17/228 |
| 9,663,124 B2 | 5/2017 | LeFebvre et al. | |
| 9,744,980 B2 | 8/2017 | Henry et al. | |
| 9,981,673 B2 * | 5/2018 | Martin | B61L 15/0081 |
| 10,137,915 B2 * | 11/2018 | LeFebvre | B61L 25/021 |
| 10,253,900 B2 * | 4/2019 | Jefford | F16K 31/082 |
| 10,267,433 B2 | 4/2019 | Brown et al. | |
| 10,343,700 B2 * | 7/2019 | Brundisch | B61L 15/0094 |
| 10,449,975 B2 * | 10/2019 | Huck | B61D 7/02 |
| 10,539,241 B2 | 1/2020 | Jackson et al. | |
| 10,710,619 B2 * | 7/2020 | LeFebvre | B61L 17/00 |
| 10,732,012 B2 * | 8/2020 | Wimmer | G01D 21/00 |
| 11,014,583 B2 * | 5/2021 | Reitz | B61D 7/20 |
| 11,070,624 B2 * | 7/2021 | Yuan | H04L 67/125 |
| 11,473,993 B2 * | 10/2022 | Gibson | F16L 55/1108 |
| 11,542,690 B2 * | 1/2023 | Gibson | F16L 55/1155 |
| 2002/0017439 A1 | 2/2002 | Hill et al. | |
| 2002/0049520 A1 | 4/2002 | Mays | |
| 2002/0111726 A1 | 8/2002 | Dougherty et al. | |
| 2003/0058091 A1 | 3/2003 | Petersen et al. | |
| 2003/0097885 A1 | 5/2003 | Kell | |
| 2003/0116742 A1 * | 6/2003 | Anderson | F16K 31/508 251/326 |
| 2003/0146821 A1 | 8/2003 | Brandt | |
| 2003/0182030 A1 | 9/2003 | Kraeling et al. | |
| 2004/0117076 A1 | 6/2004 | Horst | |
| 2004/0126043 A1 | 7/2004 | Ito | |
| 2004/0201464 A1 | 10/2004 | Oonishi | |
| 2004/0251058 A1 | 12/2004 | Carr et al. | |
| 2005/0028596 A1 | 2/2005 | Gall | |
| 2005/0194497 A1 | 9/2005 | Matzan | |
| 2005/0259598 A1 | 11/2005 | Griffin et al. | |
| 2005/0259619 A1 | 11/2005 | Boettle et al. | |
| 2005/0268813 A1 | 12/2005 | Van Auken | |
| 2006/0018141 A1 | 1/2006 | Chai et al. | |
| 2006/0042734 A1 | 3/2006 | Turner et al. | |
| 2006/0080048 A1 | 4/2006 | Kessler et al. | |
| 2006/0154398 A1 | 7/2006 | Qing et al. | |
| 2006/0158181 A1 | 7/2006 | Shoji | |
| 2006/0181413 A1 * | 8/2006 | Mostov | G08B 25/08 340/539.22 |
| 2006/0207336 A1 | 9/2006 | Miyazaki | |
| 2006/0243068 A1 | 11/2006 | Ueno et al. | |
| 2006/0264221 A1 | 11/2006 | Koike et al. | |
| 2007/0005200 A1 | 1/2007 | Wills et al. | |
| 2007/0018083 A1 | 1/2007 | Kumar et al. | |
| 2007/0062765 A1 | 3/2007 | Michel et al. | |
| 2007/0084676 A1 | 4/2007 | Vithani et al. | |
| 2007/0095160 A1 | 5/2007 | Georgeson et al. | |
| 2007/0096904 A1 | 5/2007 | Lockyer et al. | |
| 2007/0076107 A1 | 7/2007 | LeFebvre et al. | |

(56) References Cited

U.S. PATENT DOCUMENTS

| | | |
|---|---|---|
| 2007/0151812 A1 | 7/2007 | Michel et al. |
| 2007/0152107 A1 | 7/2007 | LeFebvre et al. |
| 2007/0156307 A1 | 7/2007 | Muinonen et al. |
| 2007/0186642 A1 | 8/2007 | Sano et al. |
| 2007/0208841 A1 | 9/2007 | Barone |
| 2007/0241610 A1 | 10/2007 | Smith |
| 2007/0255509 A1 | 11/2007 | LeFebvre et al. |
| 2008/0064941 A1 | 3/2008 | Funderburk et al. |
| 2008/0073606 A1* | 3/2008 | Liantonio ............ F16K 31/086 251/65 |
| 2008/0097659 A1 | 4/2008 | Hawthorne |
| 2008/0179269 A1 | 7/2008 | Bachman |
| 2008/0195265 A1 | 8/2008 | Searle et al. |
| 2008/0252515 A1 | 10/2008 | Oestermeyer et al. |
| 2009/0001226 A1 | 1/2009 | Haygood |
| 2009/0001540 A1 | 1/2009 | Yang et al. |
| 2009/0010264 A1 | 1/2009 | Zhang |
| 2009/0015400 A1* | 1/2009 | Breed ............ G07C 9/28 340/539.22 |
| 2009/0102649 A1* | 4/2009 | Diener ............ G08B 13/08 340/542 |
| 2009/0173840 A1 | 7/2009 | Brown et al. |
| 2009/0299550 A1 | 12/2009 | Baker |
| 2010/0032529 A1 | 2/2010 | Kiss et al. |
| 2010/0168941 A1 | 7/2010 | Geiger et al. |
| 2010/0200307 A1 | 8/2010 | Toms |
| 2010/0302974 A1 | 12/2010 | Niiyama et al. |
| 2011/0203685 A1* | 8/2011 | Lin ............ F16K 31/52408 137/553 |
| 2011/0219981 A1* | 9/2011 | Brandt ............ B61D 7/32 105/241.2 |
| 2011/0270475 A1 | 11/2011 | Brand et al. |
| 2011/0282540 A1 | 11/2011 | Armitage et al. |
| 2012/0037435 A1 | 2/2012 | Duehring |
| 2012/0046811 A1 | 2/2012 | Murphy et al. |
| 2012/0051643 A1 | 3/2012 | Ha et al. |
| 2012/0072266 A1 | 3/2012 | Schullian et al. |
| 2012/0166109 A1 | 6/2012 | Kernwein et al. |
| 2012/0303237 A1 | 11/2012 | Kumar et al. |
| 2013/0006451 A1 | 1/2013 | Cooper et al. |
| 2013/0116865 A1 | 5/2013 | Cooper et al. |
| 2013/0270396 A1 | 10/2013 | Agostini |
| 2013/0314239 A1* | 11/2013 | Clark ............ E03B 7/08 340/686.1 |
| 2013/0342362 A1 | 12/2013 | Martin |
| 2014/0060979 A1 | 3/2014 | Martin et al. |
| 2014/0089243 A1 | 3/2014 | Oppenheimer |
| 2014/0111356 A1 | 4/2014 | LeFebvre et al. |
| 2014/0244080 A1 | 8/2014 | Herden et al. |
| 2014/0372498 A1 | 12/2014 | Mian et al. |
| 2014/0375497 A1 | 12/2014 | Friend et al. |
| 2015/0060608 A1 | 3/2015 | Carlson et al. |
| 2015/0083869 A1 | 3/2015 | LeFebvre et al. |
| 2015/0148984 A1 | 5/2015 | Padulosi et al. |
| 2016/0027222 A1 | 1/2016 | Kurihara |
| 2016/0031849 A1 | 2/2016 | Yang et al. |
| 2016/0032576 A1 | 2/2016 | Leffler et al. |
| 2016/0272228 A1* | 9/2016 | LeFebvre ............ H04L 67/12 |
| 2016/0280195 A1 | 9/2016 | Kull et al. |
| 2016/0318497 A1* | 11/2016 | Wright ............ B60T 17/228 |
| 2016/0325767 A1* | 11/2016 | LeFebvre ............ B61L 27/40 |
| 2017/0021847 A1 | 1/2017 | LeFebvre et al. |
| 2017/0210401 A1 | 7/2017 | Mian |
| 2018/0224306 A1* | 8/2018 | Wimmer ............ G01D 21/00 |
| 2019/0225248 A1* | 7/2019 | Lidgett ............ B61D 7/26 |
| 2020/0007934 A1 | 1/2020 | Ortiz et al. |
| 2020/0079343 A1* | 3/2020 | Martin ............ B61L 15/0081 |
| 2021/0053548 A1 | 2/2021 | Michel et al. |
| 2022/0041194 A1* | 2/2022 | Lidgett ............ B61L 27/57 |
| 2022/0135093 A1* | 5/2022 | Lidgett ............ B61L 25/025 246/127 |
| 2023/0023113 A1* | 1/2023 | Ornot ............ F16K 15/18 |
| 2023/0137680 A1* | 5/2023 | Davis ............ F16K 31/08 251/65 |

FOREIGN PATENT DOCUMENTS

| | | |
|---|---|---|
| BR | 102013022303 | 8/2015 |
| CN | 1429726 A | 7/2003 |
| CN | 102238233 B | 11/2011 |
| EP | 1548419 A1 | 6/2005 |
| EP | 2650191 A1 | 10/2013 |
| GB | 2295207 A | 5/1996 |
| JP | S63236937 A | 10/1988 |
| JP | 05213195 A | 8/1993 |
| JP | 05343294 | 12/1993 |
| JP | 08015099 | 1/1996 |
| JP | 10217968 | 8/1998 |
| JP | 11192948 | 7/1999 |
| JP | 2004294419 A | 10/2004 |
| JP | 2009210301 A | 9/2009 |
| WO | 01/015001 A2 | 1/2001 |
| WO | 2005105536 A1 | 10/2005 |
| WO | 2007076107 A2 | 7/2007 |
| WO | WO-2012088666 A1 * | 7/2012 ......... F16K 31/1221 |
| WO | 2015/081278 A1 | 6/2015 |
| WO | 2015/100425 A1 | 7/2015 |
| WO | 2016/191711 A1 | 12/2016 |

OTHER PUBLICATIONS

Printout of web pages found at http://www.skybitz.com/ Available on the Internet at least as early as Sep. 23, 2013.

Printout of web pages found at http://www.transcore.com/ Available on the Internet at least as early as Sep. 23, 2013.

International Search Report and Written Opinion mailed Oct. 1, 2019 issued in International Application No. PCT/US2019/014997.

http://web.archive.org/web/20130206222004/http://lat-lon.com/gps-products/-locomotive-monitoring-unit,http://web.archive.org/web/20130206221020/http://lat-lon.com/gps-products-/solar-tracking-unit http://web.archive.org/web/20130205074831/http://lat-lon.com/gps-products--sensors Available on the Internet at least as early as Feb. 6, 2013.

Topolev, V.P.; Automation of Strain-gauge Crane Scales; Feb. 1966; Translated from Izmeritel'naya Tekhnika, No. 2, pp. 81-82.

Balkov, P.P. et al.; Electrical Strain-gauge Scales; Oct. 1961; Translated from Izmeritel'naya Tekhnika, No. 10, pp. 17-20.

MSI-9300 Series User Guide, Rev Jul. 1, 27, 2002 for SW Ver 1-1.

Dillon EDxtreme Dynamometer and Crane Scale User's Manual, Dec. 2008 EDX.sub.-U.P65 PN 29808-0011 Issue AC.

Information Disclosure Statement for Salco Technologies, LLC Handbrake Sensor—Brochure dated Mar. 30, 2007.

Printout of web pages found at http://www.id-systems.com/ Available on the Internet at least as early as Sep. 23, 2013.

Printout of web pages found at http://www.microstrain.com/wireless/sensors Available on the Internet at least as early as Sep. 23, 2013.

International Search Report in related WO Application No. PCT/IB2013/03267, dated Apr. 23, 2015.

International Search Report and Written Opinion mailed Nov. 29, 2019 issued in International Application No. PCT/US2019/041734.

European Search Report issued in European Patent Application No. 1957308 dated Sep. 8, 2021.

International Search Report and Written Opinion mailed Feb. 24, 2022 in International Application No. PCT/US2021/056508.

Extended European Search Report issued in European Patent Application No. 19833138.1 filed on Jan. 22, 2021.

* cited by examiner

| | | Operational Status 1 | Operational Status 2 | Operational Status 3 | Operational Status 4 | Operational Status 5 | Operational Status 6 | Operational Status 7 | Operational Status 8 |
|---|---|---|---|---|---|---|---|---|---|
| Discharge Gate | Close (default) | | | | ⇐ | ⇒ | ⇒ | ⇒ | |
| | Open | X | X | X | | X | X | X | X |
| Motion | Stationary (default) | | | | | | | | |
| | Moving | X | X | X | X | X | X | X | X |
| Geofence | Outside (default) | | | | | | | | |
| | Inside | X | X | X | X | X | X | X | X |
| Event/ Alarm/ Alert type | | Alarm - End security event, also possible undefined geofence for unloading or sampling event. | Non - Typical Event - Unsecured gate chatter. | Typical Event - End unloading in unloading, maintenance, railcar wash, or Generic geofence event. | Non - Typical Event - Unsecured gate chatter event. | Alarm - Security alert, also possible undefined geofence for unloading or sampling event. | Alarm - Security alert / unsecured gate. | * Typical Event - Begin unloading event or product sampling, or maintenance, railcar wash, or generic event. (these 5 events are defined by geofence type where the event takes place) | Non - Typical Event - Unsecured gate chatter event. |

* - The Alert type is a "Product Sampling" event, if a Status 7 event lasts within a predetermined period of time and then goes to a Status 3 event, and the geofence type is a Customer (unloading) type.

FIG. 8

| | | Operational Status 9 | Operational Status 10 | Operational Status 11 | Operational Status 12 | Operational Status 13 | Operational Status 14 | Operational Status 15 | Operational Status 16 |
|---|---|---|---|---|---|---|---|---|---|
| Discharge Gate | Close (default) | x | | x | | | | | |
| | Open | | x | | x | x | x | x | x |
| Motion | Stationary (default) | ⇐ | | ⇐ | | ⇐ | | ⇐ | |
| | Moving | x | ⇒ x | x | ⇒ x | x | ⇒ x | x | ⇒ x |
| Geofence | Outside (default) | | | | | | | | |
| | Inside | x | x | x | x | x | x | x | x |
| Event/ Alarm/ Alert type | | Status Change - Stopping event | Status Change - Moving event. | Status Change - Stopping event in geofence (plant) | Status Change - Moving event in geofence (plant). | Status Change - Still in Alarm condition - Stopping event. | Status Change - Still in Alarm condition - Moving event. | Status Change - Still in Alarm condition - change in movement status after unloading event, sample event, or wash, or maintenance, or generic event. Also non-typical-Stopping event in geofence (plant). | Alarm - Railcar movement status change after unloading event, sample event, or wash, or maintenance, or generic event |

FIG. 9

|  |  | Operational Status 17 | Operational Status 18 | Operational Status 19 | Operational Status 20 | Operational Status 21 | Operational Status 22 | Operational Status 23 | Operational Status 24 |
|---|---|---|---|---|---|---|---|---|---|
| Discharge Gate | Close (default) | X | X |  |  | X | X |  |  |
|  | Open |  |  | X | X |  |  | X | X |
| Motion | Stationary (default) | X |  | X |  | X |  | X |  |
|  | Moving |  | X |  | X |  | X |  | X |
| Geofence | Outside (default) | X | ⇐ | ⇒ | ⇒ | ⇐ | ⇐ | ⇒ | ⇒ |
|  | Inside | X | X | X | X | X | X | X | X |
| Event/ Alarm/ Alert type |  | Not-logically possible. Conflicting event. | Typical Event - Geofence exit event. | Not-logically possible. Conflicting event. | Typical Event - Geofence entry event. | Not-logically possible. Conflicting event. | Alarm - Geofence exit with gate unsecured. Give alert. | Not-logically possible. Conflicting event. | Status Change - Still in Alarm condition - Geofence entry with gate unsecured |

FIG. 10

DISCHARGE GATE SENSING METHOD, SYSTEM AND ASSEMBLY

REFERENCE TO RELATED APPLICATIONS

This application is a continuation of U.S. patent Ser. No. 16/256,772 (now U.S. Pat. No. 11,180,170) which was filed on Jan. 24, 2019 and claims the benefit of U.S. Provisional Patent Application Ser. No. 62/621,212, filed Jan. 24, 2018. The contents of these applications are incorporated herein by reference in their entirety.

FIELD OF THE INVENTION

The present invention relates to the field of railcar operations and safety management, and more particularly to methods and systems for collecting and analyzing operational parameters related to railcar discharge gates to monitor the status of the gates and commodities stored within the railcar, and to improve the security, safety and operating methods and systems related thereto.

BACKGROUND

Various types of freight railcars, such as hopper cars, are used to carry loose bulk commodities by rail. Such goods are loaded and contained within one or more railcar compartments, e.g. hoppers, and then offloaded at the desired location through discharge gates.

Discharge gates (which may also be referred to herein as a "gate") are ideal for use with railcars that carry bulk materials that can be off-loaded through the discharge gate via gravity and/or pneumatic means. Examples of materials carried and off-loaded through discharge gates include granular and particulate goods such as plastic pellets used for molding, grains and sugar. The discharge gates are typically located at the bottom of each compartment of the railcar. The discharge gates are operated to be opened and closed. When opened, the material flows out by means of gravity and, in some cases, the discharge gates may also be equipped with pneumatic means as known in the art to accommodate the off-loading.

Preventing theft and ensuring the integrity and cleanliness of the material within the railcar is important. Unauthorized access to the product is undesirable not only from a theft perspective, but also exposes the product remaining within the railcar to contamination and spoliation, rendering the material unsuitable for use.

Current prior art security methods include the use of security seals applied to the discharge gates at the origin where the goods are loaded, and which are then removed when the railcar reaches its intended destination. The status of the seal upon arrival at the destination can indicate whether the discharge gate has been opened during transit from its origin to destination.

Despite the use of seals, however, thieves have developed ways to disassemble sections of the discharge gate assembly in ways allowing a portion of the contents within the railcar hopper to be removed without altering the seal. The discharge gate then is re-assembled to make it appear that nothing was removed with the seal remaining intact. Loss of product or lading resulting from unauthorized opening or accessing of a discharge gate is a significant financial cost to both shippers and railroads.

Security seals and similar security means have other shortcomings. For example, seals cannot provide instantaneous warnings when a discharge gate is opened en route, or continually monitor the status of the discharge gate at any location in the rail network, including in an origin or destination rail yard.

Improvements to current security methods are needed to monitor and report operational uses of the discharge gates of the railcars at each stage of the supply chain cycle. Moreover, new methods for product chain of custody and billing terms may be possible if access to the product inside the railcar can be monitored and confirmed.

The real time monitoring of various functions of railcars, such as wheel bearing temperature, wheel-to-rail interactions, and other operational parameters of a railcar has been previously contemplated. Examples of such systems are disclosed in U.S. Pat. No. 9,663,092, issued May 30, 2017. U.S. Pat. No. 10,137,915 issued Nov. 27, 2018, US patent publication no. 2016/0272228 published Sep. 22, 2016, and U.S. Pat. No. 9,981,673 issued May 29, 2018, each of which is incorporated herein by reference in their entirety.

Presently, however, there is no reliable system for continually monitoring in real or near real time the status of discharge gates on railcars. Accordingly, it is desirable to provide methods, systems and assemblies for the real-time, on-board monitoring of the discharge gates, and for analyzing the readings in real time to timely detect anomalous security and operational conditions.

SUMMARY

In one form, the invention provides a system for detecting the operational status of a discharge gate on a railcar. The system includes a communication management unit located on the railcar. The system also includes a computer-readable storage medium that includes one or more programming instructions that, when executed, cause the communication management unit to carry out the following: receive, from one or more sensors on the railcar, status information pertaining to the discharge gate, wherein the discharge gate status information includes an indication of whether the discharge gate is open or closed; receive motion information associated with the railcar; and receive location information associated with the railcar. The system can determine, based on the status information, the motion information and the location information, whether a notification event has occurred. In response to determining that a notification event have occurred, the system can communicate a notification of the notification events to a remote receiver.

In another form, the invention provides a system for detecting the operational status of a discharge gate on a railcar as follows. The system includes: (a) a communication management unit (CMU) mounted on the railcar; (b) discharge gate sensors positioned on the discharge gate configured for sensing whether the discharge gate is open or closed, and which sensors are capable of communicating with the CMU; (c) at least one motion sensor positioned on the railcar configured for sensing whether the railcar is moving or not, and which sensor is capable of communicating with the CMU; and (d) at least one location sensor positioned on the railcar configured for sensing whether or not the railcar is within a geofence; and which sensor is capable of communicating with the CMU. The CMU is configured to perform the functions of collecting data from each of the discharge gate sensors, motion sensor, and location sensor; analyzing the collected data for a notification event; and communicating a notification to a remote site when the notification event is detected.

The invention also provides methods. In one form, a method for detecting the operational status of a discharge gate on a railcar includes: (a) sensing whether the discharge gate is open or closed by use of a sensor positioned on the discharge gate; (b) sensing whether the railcar is in motion or not by use of a motion sensor positioned on the railcar; and (c) sensing whether the railcar is within or outside an area where it is acceptable for the discharge gate to be open. Based on the information sensed in steps a, b and c, a determination is made as to whether a notification event exists, and if so a notification of the notification event is transmitted.

The invention further provides assemblies, such as a discharge gate assembly, suitable for the present invention as described below.

BRIEF DESCRIPTION OF THE DRAWINGS

The present invention will be more fully and completely understood from a reading of the Detailed Description of the Invention in conjunction with the drawings, in which:

FIG. 8 is a chart showing a preferred criteria to determine an event/alarm/alert type after a change in the operational status, this particular chart showing the event/alarm/alert type determinations when a discharge gate status changes from open to closed or closed to open, while railcar motion and railcar location remain unchanged;

FIG. 9 is a chart showing a preferred criteria to determine an event/alarm/alert type after a change in the operational status, this particular chart showing the event/alarm/alert type determinations when movement of a railcar changes from stationary to moving or moving to stationary, while railcar discharge gate status and railcar location remain unchanged;

FIG. 10 is a chart showing a preferred criteria to determine an event/alarm/alert type after a change in the operational status, this particular chart showing the event/alarm/alert type determinations when a railcar moves from inside a geofence to outside a geofence or from outside a geofence to inside a geofence, while railcar discharge gate status and railcar motion remain unchanged;

DETAILED DESCRIPTION

Methods, systems and assemblies are provided for monitoring parameters related to the discharge gates on railcars. The data obtained can be used for determining the status, history and other information related to the discharge gates and the commodity carried within the railcar. The parameters monitored include the status of the discharge gate (open or closed), the railcar motion (moving or not), and the railcar location (is the location a place where the discharge gate is expected to be open or closed).

An illustrated embodiment of the invention is discussed below with reference to the figures appended hereto. A brief overview of a railcar and train consist used in describing the invention is provided first, followed by a more detailed description of the various components, assemblies and systems that carry out the methods of the invention, followed by a detailed description of the inventive methods.

In broad terms, the invention provides sensors on the railcars to monitor and/or collect data on various parameters and conditions related to the discharge gates. These sensors communicate with a communication management unit (CMU) mounted preferably on each railcar. When there is a change in status of any of the parameters monitored, such as when the discharge gate status changes from closed to open, data collected can be analyzed to determine if an event has occurred, identify the event and issues related thereto, and to provide real time information as to the status of the discharge gates and the goods contained within the railcar. This includes determination of the events based on the time and date of the data collected, and if a problem is detected, notifications of the event, including alerts and alarms, can be forwarded for further action.

Figure 1:
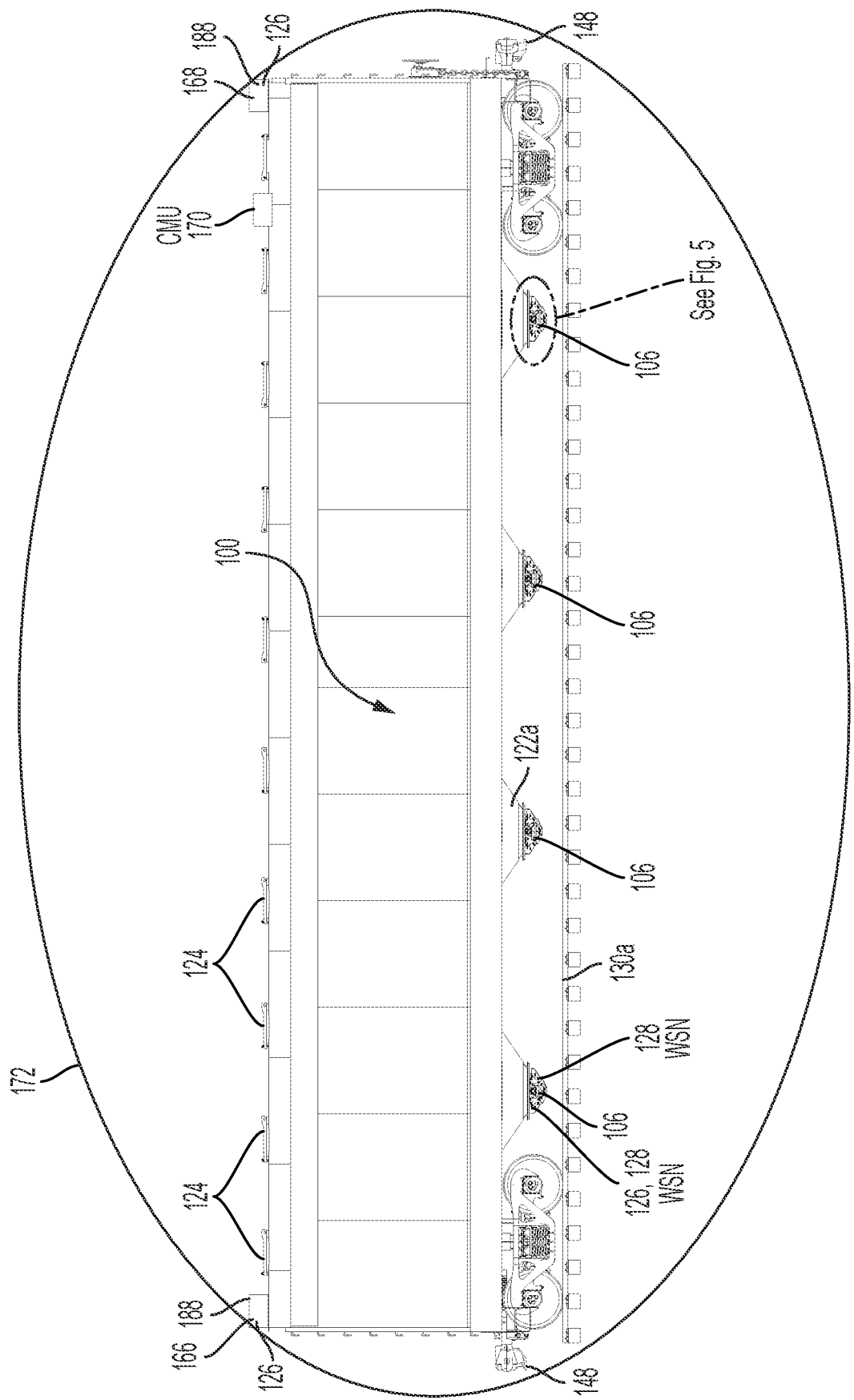
FIG. 1 is a side elevational view of a hopper car in accordance with the present invention having multiple discharge gates, multiple wireless sensor nodes (WSNs) positioned to monitor the discharge gates, a communication management unit (CMU), and which illustrates a railcar based mesh network (172) for this railcar.

With initial reference to FIG. 1, a railcar 100 is shown in the form of a hopper car having internal storage compartments for carrying goods such as loose granular or particulate commodities. As used herein, the term railcar includes single railcars as shown, as well as two or more railcars that are permanently connected, often referred to in the art as a "tandem pair", "three-pack", "five-pack", etc.

Figure 2:
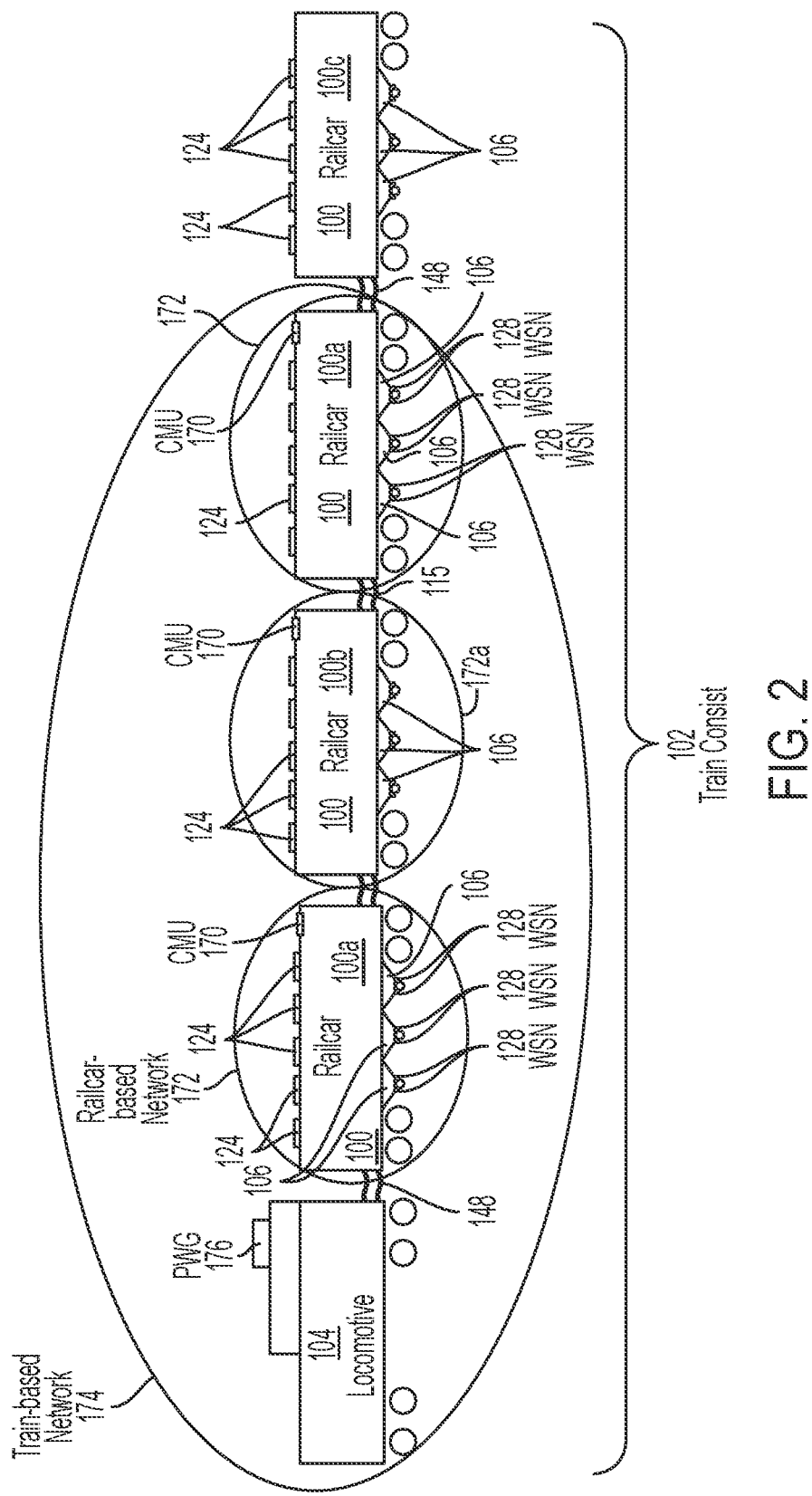
FIG. 2 is a schematic diagram of a train consist in accordance with the present invention which includes a locomotive having a powered wireless gateway (PWG), two hopper cars of the type shown in FIG. 1 (the second and fourth railcars from the right), a single hopper car that does not include WSNs but includes a CMU (the third railcar from the right), and a single hopper car that does not include WSNs or a CMU (the first railcar from the right), and which illustrates a train based mesh network (174)

With further reference to FIG. 2, a train consist 102 includes a connected group of railcars 100 and one or more locomotives 104, here a single locomotive 104 being shown. The railcars 100 and locomotive 104 are coupled with rail couplers 148 as known in the art.

Returning to FIG. 1, the railcar 100 can have one or more discharge gates 106 through which the commodity stored within the compartments of the railcar 100 is off loaded, typically via hoses connected to each of the discharge gates 106. One discharge gate assembly 106 is typically provided at the bottom of each storage compartment. The illustrated embodiment has four discharge gates 106, one for each of the four compartments (not shown) of the railcar 100.

Any suitable discharge gate can be used. An example of such a discharge gate, which is similar to the one shown in the illustrated embodiment, is described in U.S. Pat. No. 4,934,877, issued Jun. 19, 1990, and which is incorporated by reference herein in its entirety. Each of the illustrated discharge gates 106, as described in U.S. Pat. No. 4,934,877, has two sets of operating levers 108a, 108b (see FIG. 5) and a discharge opening 115 (see FIG. 7B) on opposite sides of the railcar 100 to allow the commodity to be discharged from either side of the railcar. The illustrated discharge gate 106 has two internal rotatable valves (not shown), each one operated by one of the operating levers 108a, 108b (see FIG. 5) from either side of the railcar 100 to control the flow of the commodity from the discharge gate. The particular lever 108a. 108b is selected depending on which side of the railcar the commodity will be discharged.

Figure 5:
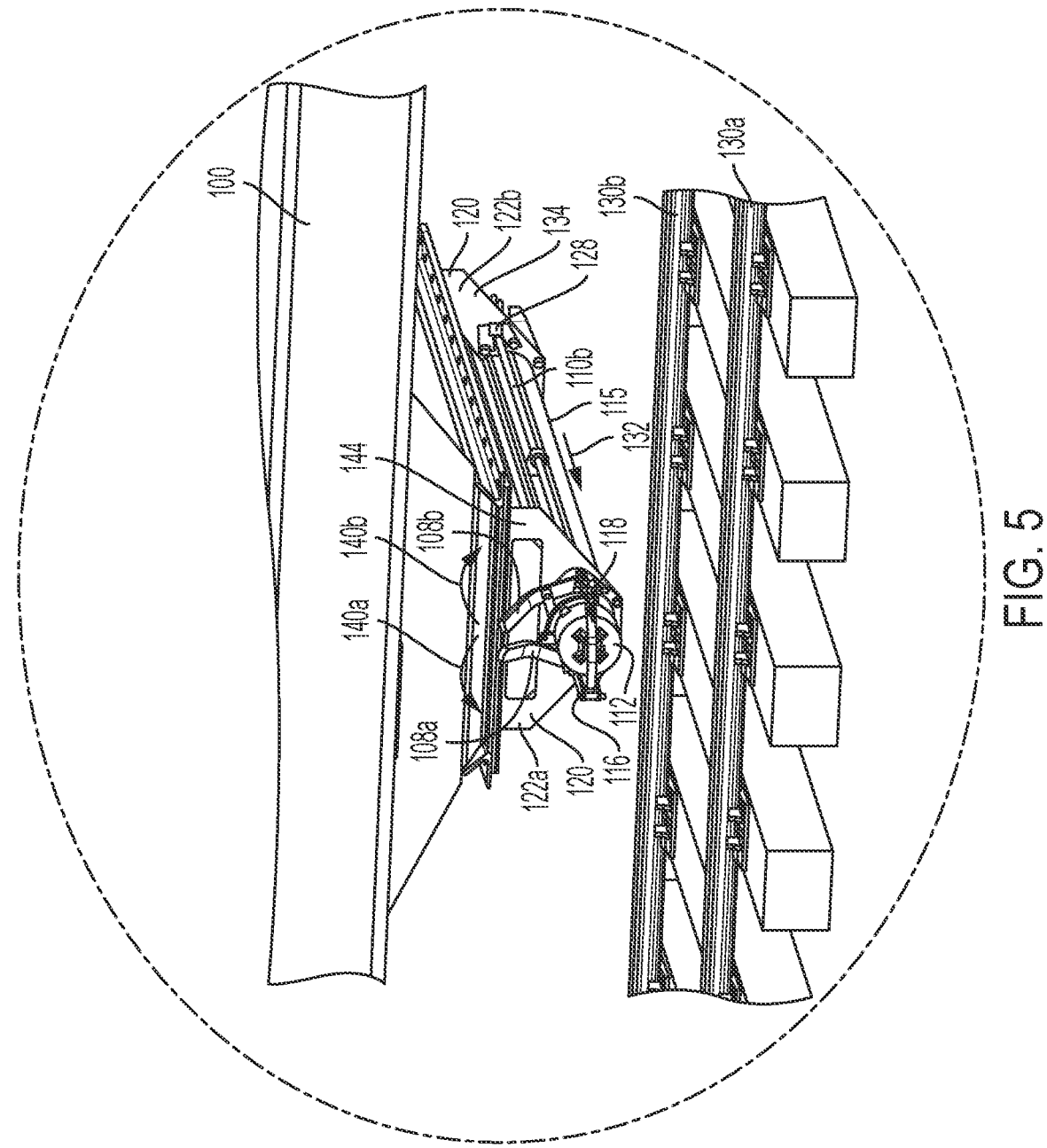
FIG. 5 is an enlarged perspective view of the portion within the area identified in FIG. 1, showing the discharge gate.
Figure 6:
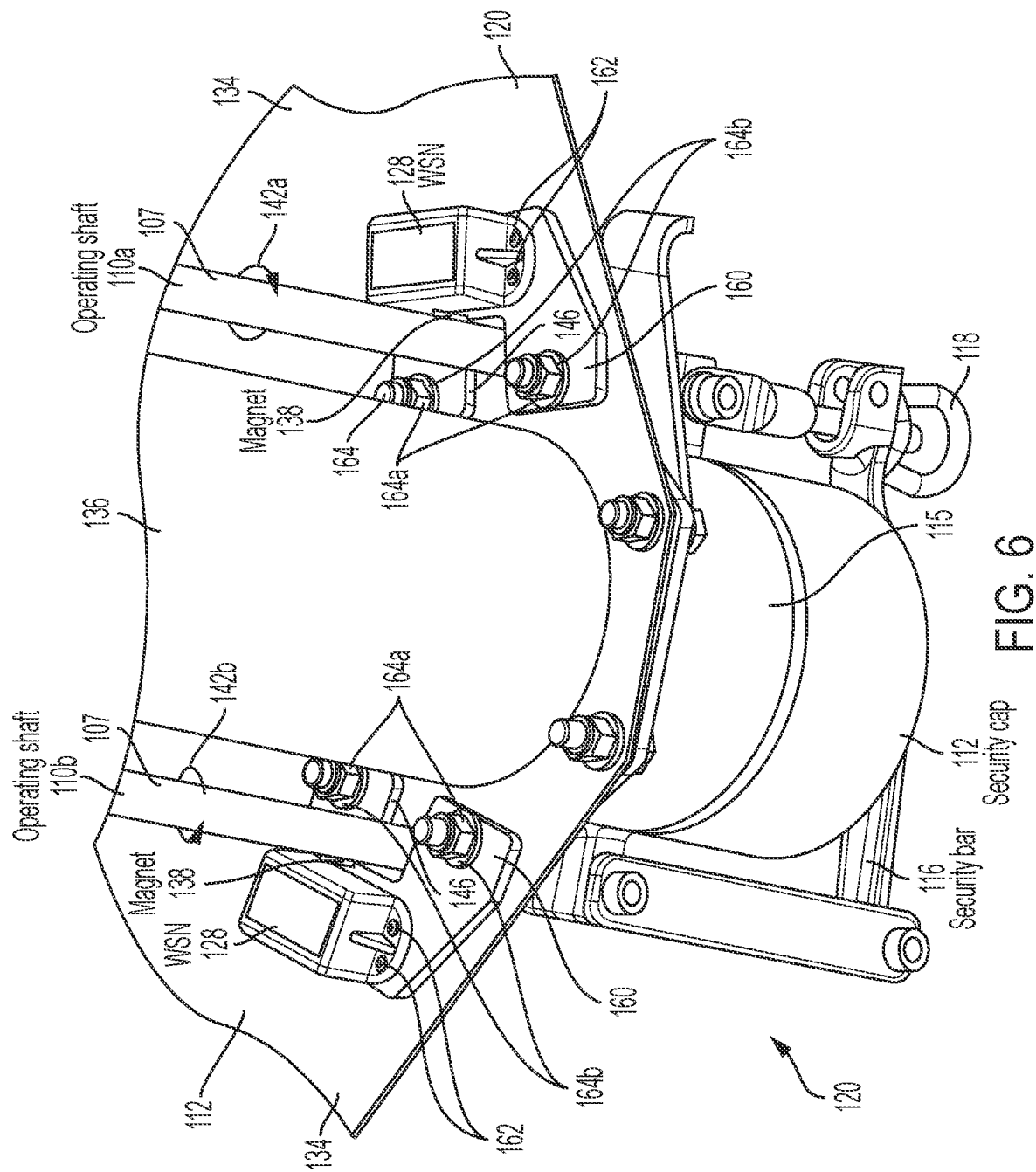
FIG. 6 is a partial perspective view of the railcar discharge gate assembly shown in FIG. 1 having magnetic sensing WSNs of the type shown in FIG. 4 and magnets that work with the WSNs for sensing the status of the discharge gate.
Figure 7A:
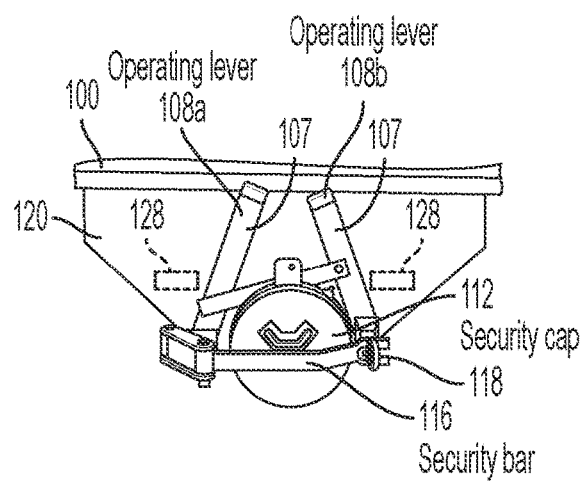
FIGS. 7A, 7B, 7C and 7D are enlarged side elevational views of the discharge gate of FIG. 6 showing the operating levers that control the opening and closing of the discharge gate in different positions.
Figure 7B:
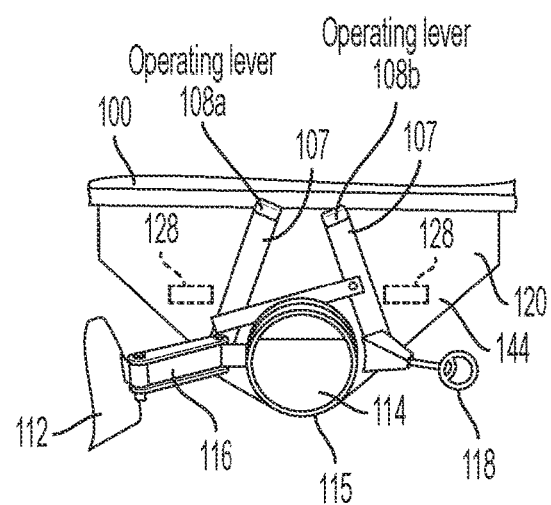

Each operating lever 108a, 108b of a discharge gate 106 is connected to and operates a respective shaft 110a, 110b, which in turn are attached to and operate one of the rotatable valves that release the commodity. When the position of both operating levers 108a, 108b are in the upward position as seen in FIGS. 6, 7A and 7B, the respective valves are closed, and thus the discharge gate 106 is closed and no commodity is discharged. When operating lever 108a is rotated to the left direction (counter clockwise) as seen in FIG. 5, the respective rotatable valve operated thereby moves to an open position. When operating lever 108b is rotated to the right direction (clockwise) as seen in FIG. 5, the respective rotatable valve operated thereby moves to an open position. The two operating levers 108a. 108b can be operated independent of one another. For example, with reference to FIG. 7C, right side operating lever 108b is in the valve open position while left side operating lever 108a is in the valve closed position. With reference to FIG. 7D, both operating levers 108a and 108b are in the valve open position. If any one of the levers 108a, 108b is in the open position, then the discharge gate 106 is in the open position or, put another way, if any one of the levers 108a, 108b is in the open position, the status of the discharge gate 106 is "open".

It is appreciated that the discharge gate 106 illustrated in the present invention, as well as other suitable discharge gates, include operable components 107 that move or are displaced as part of the operation to open and close the discharge gate. These operable components 107 include the operating levers 108a, 108b operable by a person to open and close the discharge gate 106, the operating shafts 110a, 110b operable by the levers 110a, 110b, and the discharge gate valves operable by the operating shafts 110a, 110b, and can include any other such components that move or change when opening or closing the discharge gate 106. It is further appreciated that various measureable parameters of these operable components 107, such as their displacement and position, is indicative of whether the discharge gate is open or closed.

As seen in FIGS. 5 and 7A, the discharge gate 106 includes a security cap 112 that covers the discharge opening 114 of the discharge conduit 115 (see FIG. 7B) of the discharge gate 106. A security bar 116 attached to the front of the security cap 112, and locked in place with a releasable bolt device 118, can be pivoted towards the left as seen in FIG. 7B to remove the security cap 112. With the security cap 112 removed, a hose (not shown) can be connected to the discharge gate conduit 115 for discharging the commodity from the railcar through the opening 114 via operation of the levers 108a, 108b as is known in the art.

The discharge gate assembly 106 has support plates 120 on opposite ends 122a, 122b of the discharge gate 106, which are on opposite sides of the railcar 100, to support the discharge gate assembly 106 on the underside of the railcar 100 (FIG. 5). The support plates have an outer face 144 facing away from the railcar 100 and an opposite inner face 134 facing towards the railcar 100 (see the opposite end 122b in FIG. 5 and FIG. 6). A duplicate set of levers 108a. 108b connected to the operating shafts 110a, 110b, and a duplicate set of gate openings 114 are provided on each of the opposite ends 122a. 122b so that the discharge gate 106 can be operated from either side of the railcar 100 (although only the operating levers 108a, 108b on railcar side 122a and operating shaft 110b are shown in FIG. 5). Again, a detailed description of the discharge gate 106 described herein is provided in U.S. Pat. No. 4,934,877.

With reference to FIGS. 1 and 2, one or more hatches 124 are provided on top of each of the railcars 100. The hatches 124 provide access to the storage compartments within the railcars 100, such as for loading the commodity into the railcars.

Various sensor devices 126 are provide for collecting data about the railcars 100 and the discharge gates 106 to carry out the methods of the current invention. As noted previously, the data to be collected in the illustrated embodiment includes the status of each discharge gate 106 (open or closed), whether the railcar 100 is in motion or not, and the location of the railcar 100 (is it within a geofence area where opening of the discharge gate is expected). While particular sensors 126 are described below for the illustrated embodiment, any suitable sensors can be used.

Figure 4:
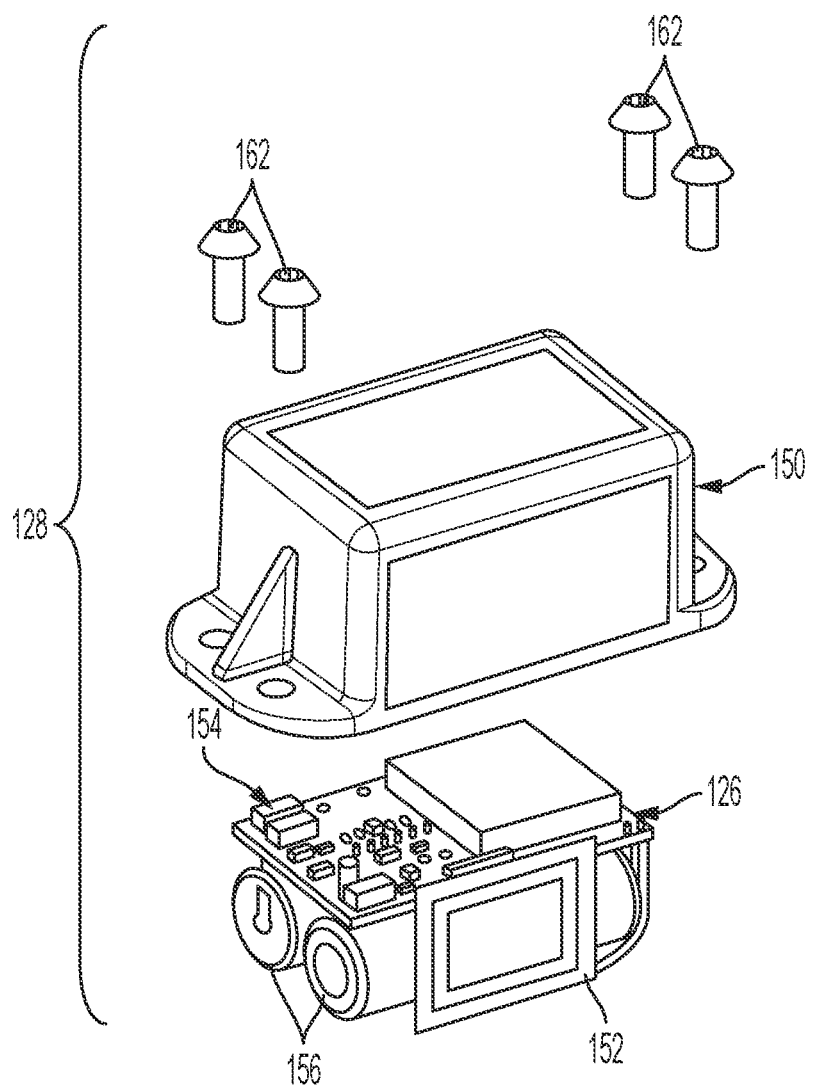
FIG. 4 is an exploded view of a wireless sensor node (WSN) for use sensing the status of a discharge gate.
Figure 4A:
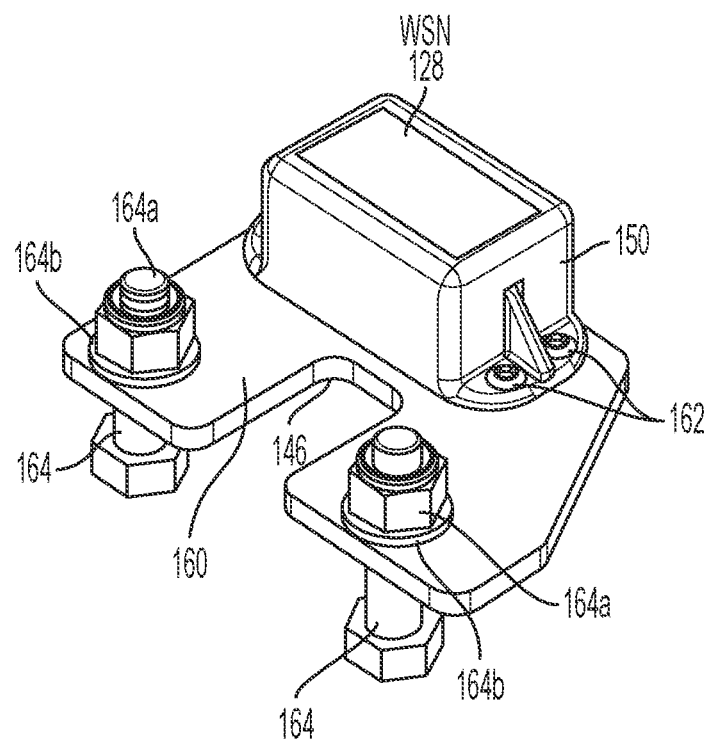
FIG. 4A is a perspective view of the wireless sensor node (WSN) of FIG. 4 attached to a bracket to be attached to the discharge gate assembly for sensing whether the discharge gate is open or closed.

A preferred sensor device 126 for use with the present invention is the wireless sensor node ("WSN") 128 as shown in FIGS. 4, 4A and 6. WSNs 128 can be located at various locations on a railcar 100 to collect data from internal sensors 126, and can process and analyze the data collected to determine if the data needs to be transmitted immediately, held for later transmission, or aggregated into an event or alert, among other actions. Such WSNs 128 can be specific for collecting one type of data, or can include multiple internal sensors for collecting multiple types of data. WSNs 128 can include temperature sensors, load sensors, strain sensors, pressure sensors, hall effect sensors, accelerometers, gyroscopes. GPS, and proximity sensors among others, depending on the operational parameter desired to be monitored, e.g., outdoor temperature, bearing temperature, vibrations, location, speed, brake status, and railcar accelerations as described in the patent documents incorporated by reference above. The present invention provides one or more WSNs 128 configured for sensing the status of the discharge gates 106 as described below.

As discussed above, the discharge gate 106 has operable components 107 that move or change as part of the operation to open and close the discharge gate 106. The movement, position and/or other changes of these operable components 107 are indicative of whether the discharge gate 106 is open or closed. Accordingly, one or more of the operable components 107 can be monitored with sensors 126, such as the WSNs 128, to obtain information as to whether the discharge gate is open or closed. In the present embodiment, the rotational position of the operating shafts 110*a*, 110*b* are monitored. Any suitable sensors can be used depending on the particular operable components 107 to be monitored and the particular operation of the operable components. Such sensors, by way of example, can include motion sensors, displacement sensors, optical sensors, position sensors, reed switch sensors, magnetic field sensing sensors, etc.

With further reference to FIGS. 5 and 6, the discharge gate 106 of the illustrated embodiment has two operating levers 108*a*, 108, each of which can rotate a respective operating shaft 110*a*. 110*b*, which in turn operate a respective internal rotatable valve (not shown) for opening and closing the discharge gate 106. The specific lever 108*a*, 108*b* is chosen depending on which side of the railcar the commodity will be discharged. FIG. 6 is a view from underneath the discharge gate 106 between the tracks 130*a*, 130*b* looking towards the end 122*a* of the discharge gate as indicated by arrow 132 in FIG. 5, so as to see the inner face 134 of the support plate 120 and the underside 136 of the discharge conduit 115. A WSN 128 is provided for each operating shaft 110*a*, 110*b* to sense the rotational position of the respective operating shaft, which rotational position is indicative of the status of the discharge gate valve associated therewith. Since the operating shafts 110*a*. 110*b* are operable by either set of operating levers 108*a*, 108*b* on either side of the railcar 100, the two WSNs 128 are sufficient to monitor the discharge gate status regardless on which side of the railcar 100 the levers 108*a*. 108*b* are operated.

With specific reference to FIG. 6, a WSN 128 is provided adjacent the operating shaft 110*a* (right side of the figure) mounted on the inner face 134 of the support plate 120. The WSN 128 cooperates with a complementary sensor magnet 138 attached to the operating shaft 110*a* adjacent to the WSN 128 associated therewith. As the operating lever 108*a* rotates the operating shaft 110*a*, the attached magnet 138 moves either away from or closer to the associated WSN 128 depending on the whether the particular internal rotatable valve is being opened or closed. Operating shaft 110*b* (left side of FIG. 6) has a similar configuration with a WSN 128 and magnet 138. Based on the proximity of the magnets 138 to their respective WSNs 128, the status of each of the internal rotatable valves can be determined indicating the state of the discharge gate 106. Again, if any one lever 108*a* or 108*b* is open. i.e., any one of the internal rotatable valves is open, the status of the discharge gate 106 is "open".

For example, if operating lever 108*a* as seen in FIG. 5 is rotated counterclockwise (arrow 140*a*) to open its respective internal rotatable valve, the operating shaft 110*a* as seen in FIG. 6 will rotate clockwise (arrow 142*a*) such that the magnet 138 will move away from the associated WSN 128 to a position detected by the WSN 128 indicating that the internal rotatable valve associated with that WSN 128 is in an open position. Similarly, if the operating lever 108*b* as seen in FIG. 5 is rotated clockwise to close the valve, the WSN will detect that the magnet 138 has moved to a position indicating that the internal rotatable valve is closed. The WSN 128 for the operating lever 108*b* and its respective operating shaft 110*b* rotate in the opposite directions as shown via arrow 140*b* and 142*b* to open the internal rotatable valve. The WSN 128 can be configured to indicate a change in state, between valve open and closed, based on movement of the magnet of a threshold distance relative to the WSN 128. The WSN 128 may also be configured and tuned to sense the various degrees of rotation of the operating shafts 110*a*. 110*b* to determine how much the respective internal rotatable valves of the discharge gate is opened.

With reference to FIG. 4, an exemplary WSN 128 is now described. The WSN 128 has a housing 150 composed preferably of a hard plastic resistant to environmental damage, such as a UV rated polymer and water, e.g., a polycarbonate/ABS blend. After the various components are installed within the housing 150 as described below, a potting material (not shown) is provided in the housing 150 to maintain, encapsulate and environmentally seal the components within. Any suitable electrical potting material capable of protecting the electric circuitry and components from the harsh railroad environment can be used, where harsh weather. UV exposure, humidity, vibration, mechanical impact, thermal shocks and abrasion might occur while the device is in operation. Such materials include epoxies, polyurethanes and silicone compounds. A flexible urethane suitable for electrical use and through which wireless signals of the frequencies to be used can be transmitted is preferred. An antenna for communications can be provided in a void within the housing not filled with the potting material to avoid interference.

A sensor 152, e.g., a magnet sensing reed switch for sensing the proximity or position of the magnet 138, is provided within the housing 150. Electrical circuitry 154 includes the components and wiring to operate and/or receive and process the information from the reed switch 152 as is known in the art. This can include, but is not limited to, analog and digital circuitry. CPUs, processors, circuit boards, memory, firmware, controllers, power conditioning circuitry and other electrical items, as required to operate the sensor and process the information as further described below. In the illustrated embodiment, the circuitry 154 is in electrical communication with the reed switch 152 for receiving signals therefrom. The electrical circuitry 154 may also include intelligence sufficient to perform analysis of the data, and may accept parameters from outside sources regarding when alarms should be raised.

The circuitry 154 also includes components for wireless communications such as WiFi. Preferably, each WSN 128 is capable of forming an ad-hoc mesh network with other WSNs on the same railcar and with a communication management unit 170 ("CMU") preferably mounted on the same railcar 100 as further described below. Circuitry also includes a long-term power source (e.g. a battery, solar cell, energy harvester, or internal power-generating capability), preferably a military grade lithium-thionyl chloride battery 156. The circuitry may also provide power conditioning and management functions and may include a feature to conserve battery life. Here, there is always an active input to the processor tied to the reed switch, and if it changes state then the processor is woken up to process the information, determine decisions based on a logic tree, and either sends a message or goes back to sleep based on the situation.

The WSNs 128 and the complementary magnets 138 are attached at the desired locations using any suitable means, including epoxy adhesives and mechanical fasteners. With reference to FIGS. 4A and 6, a preferred mechanical mount for each WSN 128 is shown. With reference to the operating lever 108*a* and operating shaft 110*a* as seen in FIG. 6, the WSN 128 is fastened to a bracket plate 160 using four screws 162. The bracket plate 160 with the attached WSN 128 is then attached to the inner face 134 support plate 120 of the discharge gate 106 with bolts 164, nuts 164a and washers 164b. The bracket plate 160 is notched at 146 as shown to partially surround the operating shaft 110a, positioning the WSN 128 adjacent to, i.e., in close proximity to, the complementary magnet 138 attached to the respective operating shaft 110a.

The magnet 138 is attached to the operating shaft 110a via epoxy although mechanical means such as fasteners can be used. The WSN 128 is positioned to sense the position of the magnet 138 in relation to the respective WSN 128, and a change in such position. The mount of the WSN 128 and its associated magnet 138 for operating lever 108b and operating shaft 110b are similar as shown.

FIGS. 7A, 7B. 7C, and 7D show the discharge gate operating levers 108a, 108b in various positions. Shown in broken line on the outer face 144 of the support plate 120 is the position of the WSNs 128 mounted on the inner face 134 (opposite side) of the support plate 120, adjacent the operating shafts 110a, 110b as described previously (see FIG. 6 showing the WSNs 128 on the inner face 134 of the plate 120 and FIG. 5 showing the WSN 128 on the inner face 134 of the supporting plate 120 at the end 122b adjacent the operating lever 110b).

FIG. 7A shows both operating levers 108a. 108b pointed upward, the security cap 112 covering the discharge conduit opening 114, and the security bar 116 extending across the security cap 112, indicating that the discharge gate 106 is in the closed position. As seen in FIG. 6, when the operating levers 108a. 108b are in this position, the magnet 138 is aligned with (adjacent to or in close proximity to) its respective WSN 128, which in this position is configured to indicate that the discharge gate is "closed".

FIG. 7B shows the security bar 116 and security cap 112 removed, but the operating levers 108a, 108b are still in an upward and thus closed position, although the levers 108a. 108b can now be moved. Nevertheless, with both operating levers 108a, 108b in the closed position, the status of the discharge gate 106 is "closed".

Figure 7C:
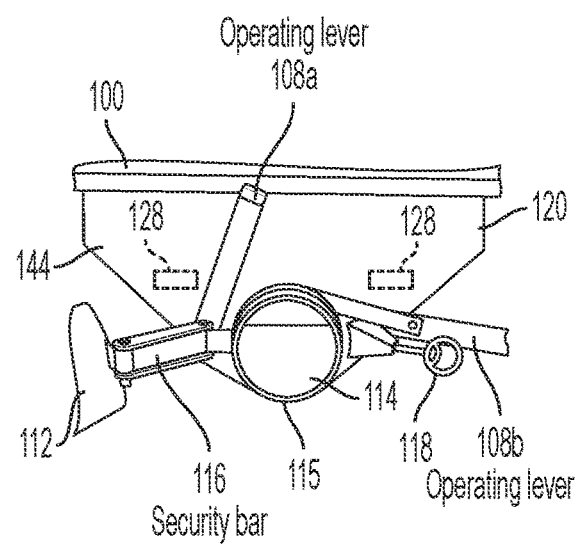
Figure 7D:
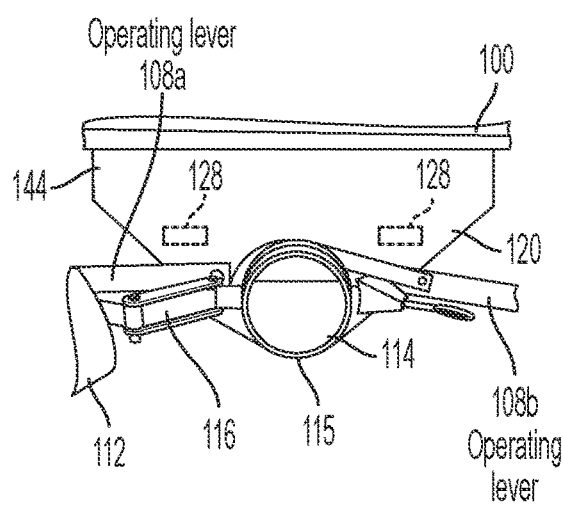

FIG. 7C shows operating lever 108a in the closed position, but operating lever 108b is in the open position, having been rotated clockwise. With reference to FIG. 6, the clockwise rotation of the operating lever 108b rotated the respective operating shaft 110b and the magnet 138 thereon a threshold distance away from the respective WSN 128, indicating that the section of the discharge gate 106 operated by the lever 108b is "open", allowing commodity within to discharge from the opening 114. Lever 110b opens an internal rotatable valve to discharge commodity from the opening 114 on the side of the railcar 100 shown. Lever 110a would operate the internal rotatable valve for discharging commodity on the opposite side of the railcar. With at least the one operating lever 110b in an open position, the status of the discharge gate 106 is "open".

FIG. 7D shows both operating levers 110a, 110b in the open position, and thus both respective operating shafts 110a, 110b and the respective magnets 138 thereon are rotated away from their respective WSNs 128 to indicate that both sections of the discharge gate 106 are "open". In this embodiment, when the distance of the magnet 138 from its respective WSN 128 is greater than a predefined threshold, the system is configured to read this as an "open" event, and when less than the predefined threshold a "closed" event. Although both operating levers are in an open position, since at least one operating lever 110b in an open position, the status of the discharge gate 106 is "open".

The security bar 116 and security cap 112 of the discharge gate 106 are not monitored in this embodiment. The operating levers 108a. 108b are not operable when the cap 112 is in place.

The discharge gate 106 described above is typical of a type of discharge gate 106 used in the industry. Other discharge gate configurations made by different manufacturers are suitable for use with the present invention. Depending on the particular configuration of the discharge gate and its operable components 107, suitable sensors to determine whether it is "open" or "closed" can include proximity and displacement sensors such as reed switches, contact switch sensors, limit switches, optical sensors and any other type of sensor that can work with the particular operable components of the discharge gate to sense a parameter indicative of the status of the discharge gate. For example, for some discharge gate configurations it may be preferable to monitor directly the position and/or displacement of the operating lever or levers rather than the operating shafts as illustrated above.

The number of WSNs 128 used to monitor each discharge gate 106 depends on the particular configuration of the discharge gate 106 and the particular parameter being monitored. Thus, as few as one WSN 128 may be suitable, such as for a discharge gate 106 having a single operating lever or multiple WSNs for more components to be monitored. Regardless of the total number of WSNs 128 for each discharge gate 106, the status of the discharge gate 106 is to be determined.

The WSN 128 discussed above will monitor the status of the discharge gate 106. Sensors 126 are also provided to monitor motion and location of the railcar 100. For monitoring railcar motion (e.g., moving or not), any suitable motion sensor 166 such as an accelerometer or GNSS, is preferred. For monitoring the location of the railcar 100 (in or not in an area where it is expected that the discharge gate 106 could be opened), any suitable location sensor 168 such as a GNSS is preferred.

It is appreciated that the WSNs are versatile and can include different types of sensors 126 for sensing different types of parameters, including railcar motion and railcar location. Additionally, the WSNs 128 described above for use with the discharge gates 106 can also include multiple sensors, including sensors for detecting motion of the railcar 100 and the location of the railcar 100 depending on the configuration desired. FIG. 1 shows motion and location sensors 166 and 168 in their own WSNs 188 located on the railcar 100 as one alternative, although in the illustrated embodiment described herein the sensors for motion and location are provided in the CMU 170 as described below. Examples of WSNs for monitoring numerous different parameters are disclosed in U.S. Pat. No. 9,981,673 noted above.

With reference to FIGS. 1 and 2, a communication management unit ("CMU") 170 is located preferably on the railcar 100 and controls the railcar based network 172 for the railcar 100, preferably a wireless mesh network as described below, overlaid on railcar 100. The CMU 170 is preferably a single unit that would serve as a communications link to other locations having remote receivers, such as the powered wireless gateway 176 (preferably located on locomotive 104), or a remote railroad operations center 178, and have the capability of processing the data received. The CMU 170 also communicates with, controls and monitors the WSNs 128 in the local railcar based network 172. The CMU 170 preferably includes such hardware as a processor, a power source (e.g. a battery, solar cell, energy harvester, or internal power-generating capability), a global navigation satellite system (GNSS) device such as a global positioning system ("GPS") receiver, Wi-Fi, satellite, and/or cellular capability, a wireless communications capability for maintaining the railcar based mesh network 172, wireless communication with a train-based mesh network 174 (FIG. 2) and, optionally, one or more sensors which may include, depending on the operational parameters to be monitored, but not limited to, an accelerometer, gyroscope, proximity sensor, temperature sensor, etc.

Although the railcar based network 172 in the illustrated embodiment is a wireless mesh network, other types of networks 172 may be used such as any suitable wired and wireless type networks.

In the present application, the CMU 170 preferably includes sensors that complement the WSNs 128 monitoring the discharge gates 106, these include a motion sensor 166 for monitoring railcar motion, such as an accelerometer, and a sensor 168 for monitoring railcar 100 location, such as a GNSS, e.g., a GPS. Although these sensors could be provided in separate WSNs located on the railcar 100 or included in the WSNs 128 for the discharge gate 106 as discussed above, in the illustrated embodiment they are preferably provided in the CMU 170 as discussed below. Those skilled in the art will appreciate that GPS is just one form of a global navigation satellite system (GNSS). Other types of GNSS may be used which include GLONASS and BeiDou.

CMU 170 supports one or more WSNs 128 in a mesh network configuration using open standard protocols, such as the IEEE 2.4 GHz 802.15.4 radio standard. Additionally, see FIG. 2, the CMU 170 is also a member of the train-based mesh network 174, which consists of the CMUs 170 from all enabled railcars 100 in the train consist 102, controlled by a powered wireless gateway ("PWG") 176, typically located on a locomotive 104.

In the illustrated embodiment, the CMU 170 preferably supports at least four functions: 1) manages a low-power railcar based mesh network 172 overlaid on a railcar 100; 2) consolidates data from the WSNs 128 in the railcar based mesh network 170 and applies logic to the data gathered to generate and communicate information such as warning alerts to a host such as a locomotive 104 or remote railroad operations center 178; 3) supports built-in sensors, such as an accelerometer to monitor railcar motion and a GPS to monitor location, and which can provide an analysis of this data to determine the facts and generate alerts; and 4) supports bi-directional communication upstream to the host or control point, such as the locomotive 104 and/or an off-train monitoring and remote railroad operations center 178 or remote server 192, and downstream to one or more WSNs 128 located on the railcar 100.

CMUs 170 may communicate wirelessly to the PWG 176 as defined below in the network configuration, or may be configured to communicate through a wired connection, for example, through the ECP (electronically controlled pneumatic) brake system.

The CMU 170 is capable of performing advanced data analysis using data collected from one or more WSNs 128 and may apply heuristics to draw inferences and conclusions from this data or alarms regarding the status of the discharge gates 128, and of transmitting data and notifications to a remote receiver such as that of the PWG 176 or off train operations center 178. The thresholds for each of WSNs 128 may be dynamically programmed by commands generated internally or received externally from the CMU 170. It is appreciated the CMU could be combined with one or more of the WSNs, particularly as components are miniaturized. Such a WSN with the CMU could be provided on the discharge gate 106 as indicated above.

With reference to FIG. 2, the powered wireless gateway 176 ("PWG") is preferably located on a locomotive 104 or elsewhere on the train consist 102 where there is a source of external power. It typically will include a processor, a GNSS receiver, one or more sensors, including, but not limited to, an accelerometer, gyroscope, or proximity sensor, temperature sensor; a satellite and or cellular communication system; local wireless transceiver (e.g. WiFi); an Ethernet port; a high capacity mesh network manager and other means of communication. The PWG 176 may have power supplied by the locomotive 104, if located on a powered asset such as a locomotive 104, or may derive its power from another source, for example, from a solar power generator or from a high-capacity battery. The PWG 176 controls the train-based network 174 overlaid on the train consist 102, consisting of multiple CMUs 170 from each railcar 100 in the train consist 102. Again, a train-based mesh network is preferred.

The components and configuration of the PWG 176 are similar to that of the CMU 170, with the exception that the PWG 176 typically draws power from an external source, while the CMU 170 is self-powered. Additionally, the PWG 176 collects data and draws inferences regarding the performance of the train consist 102, and train-based mesh networks 174, as opposed to the CMUs 170, which draw inferences regarding the performance of individual railcars 100, railcar based mesh network 172 and in this case the discharge gates 106.

In summary. WSNs 128 with sensors configured to determine the status of the discharge gates 106, i.e., open or closed, was described. The WSNs 128 include a magnetic reed switch sensor and are positioned on the discharge gate 106 to sense the position of the operating shafts 110*a*. 110*b*, which are indicative of whether or not the discharge gate 106 is open or closed. A motion sensor 166 for determining whether the railcar is in motion is provided, preferably via an accelerometer incorporated in the CMU 170. A location sensor 168 for determining the location of the railcar 100 is provided, preferably via a GNSS device, e.g. GPS, incorporated in the CMU 170. The CMU 170 can receive data from the various sensors and determine if an event related to one or more of the discharge gates 106 has occurred, determine if a notification of an event such as an alarm or alert or other communication is to be sent to a remote receiver such as the PWG 176 and, if warranted, sent off train via the PWG 176 to a remote site such as the remote railroad operation center 178. Having described various components, assemblies and systems for use in the present invention, preferred methods using the data collected about the status of the discharge gates, motion of the railcar 100, and location of the railcar 100, are described below in further detail.

System Operation

Figure 3:
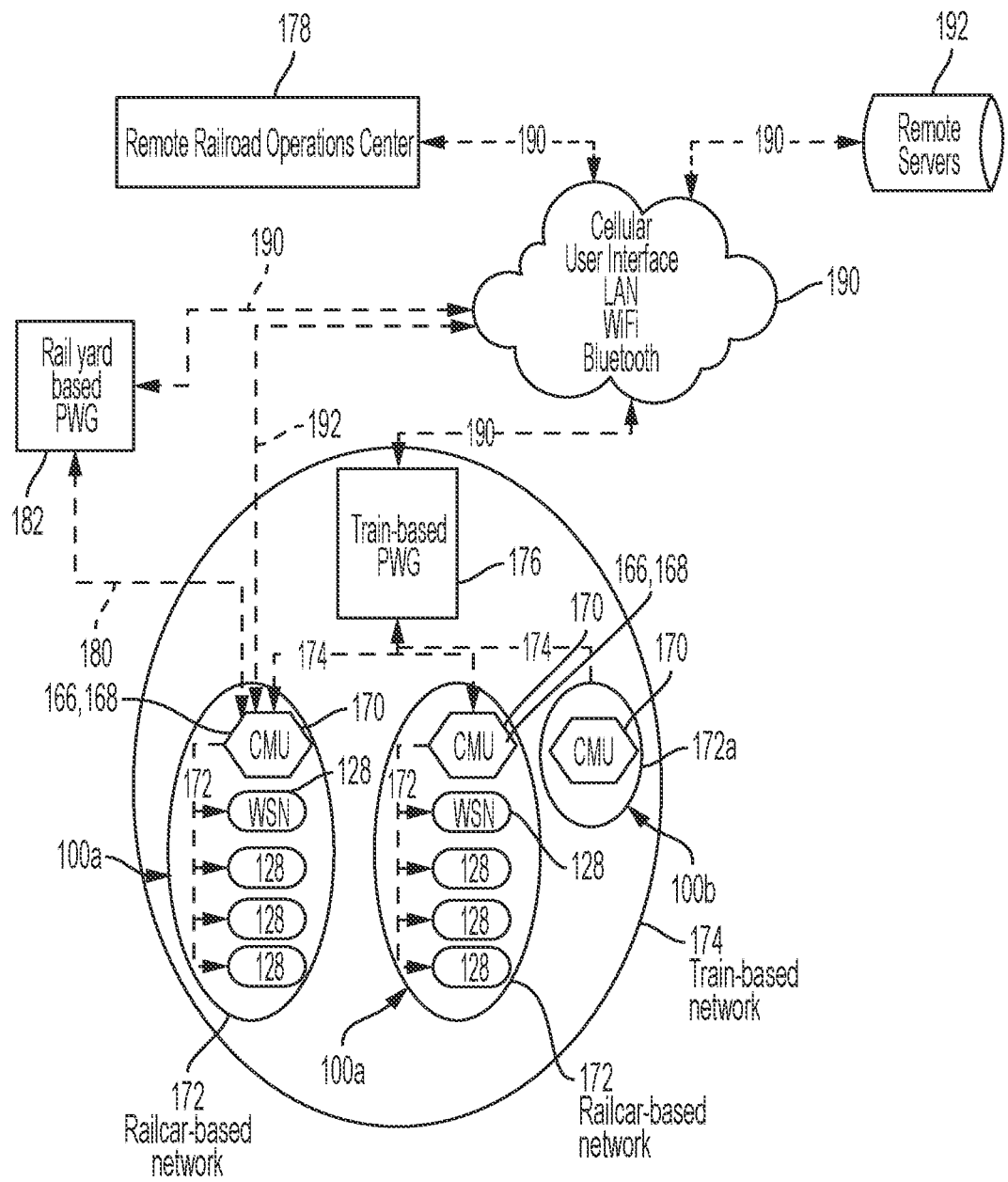
FIG. 3 is a block diagram of the train-based mesh network for the train consist shown in FIG. 2, and illustrating various means of communicating data off-train in accordance with an embodiment of the present invention.

With further reference to FIG. 3, in addition to FIGS. 1 and 2, an overview of the illustrated system operation is described. Of the railcars 100 in the train consist 102, the two railcars 100*a* have a railcar based network 172 that includes the CMU 170 installed on the railcar 100*a* and one or more WSNs 128 on the discharge gates 106 to monitor the status thereof. In FIG. 3, four WSNs 128 are shown within the railcar based network 172 for each railcar 100*a* for illustrative purposes although each railcar 100*a* of the illustrated embodiment has eight WSNs—two WSNs 128 on each of the four discharge gates 106. The CMU 170 and WSNs 128 work together to collect and analyze the data (information) from the sensors 126 in the WSNs 128. The CMU 170 also controls the railcar based mesh network 172 on the railcars 100a and is able to configure one or a more of the WSNs 128 in a local network to transmit, listen, or sleep at precise times, or to change the parameters under which the WSNs 128 operate and detect events.

With reference to FIGS. 2 and 3, the railcar 100b of the train consist 102 includes a CMU 170 as part of its railcar based network 172a, but has no WSNs associated with its discharge gates 106. Railcar 100c has neither a CMU nor WSN, has no railcar base network, and thus is a dark car that does not communicate with the train-based network 174. The discharge gates 106 of the railcars 100a can be monitored, while those of railcars 100b and 100c without the WSNs 128 or any other sensors 126 capable of monitoring the discharge gates 106 cannot.

Each WSN 128 is in two-way communication with its respective CMU 170 mounted on the railcar 100, which collects the data from each WSN 128 and can send instructions to the WSN 128. As previously discussed, the CMU 170 and each WSN 128 on the same railcar 100 preferably form the local area ad-hoc railcar based mesh network 172 to facilitate communications between them. Message packet exchanges are preferably synchronized so that no packets collide on the railcar based network 172, and every packet is scheduled and synchronized for energy efficiency. Communication traffic on railcar based network 172 can be protected by encryption, message integrity checking, and device authentication.

The train-based mesh network 174 is overlaid on the train consist 102 and includes the PWG 176 installed on a host or control point such as the locomotive 104, or on another asset with access to a power source, and one or more CMU's 170, each belonging to the train-based mesh network 174 and to the respective railcar based mesh networks 172. It is seen that the CMU's 170 can belong to two networks, the respective railcar based network 172 and the train-based network 174, but is only required to belong to the railcar based network 172 such as when the individual railcar 100 is separated from the remainder of the train consist 102. The CMU 170 and multiple WSNs 128 installed on railcars 100 form a railcar based mesh network 172 and communicate with the PWG 176 on a host or control point, such as a locomotive 104 or other asset, forming the train-based mesh network 174.

The train-based mesh network 174 uses the preferred overlay mesh network to support low-power bi-directional communication throughout train consist 102 and with the PWG 176 installed on the locomotive 104. The overlaid train-based mesh network 172 is composed of wireless transceivers embedded in the CMU 170 on each railcar 100. Each CMU 170 is capable of initiating a message on the train-based mesh network 174 or relaying a message from or to another CMU 170. The overlay train-based mesh network 172 is created independently of, and operates independently of the railcar based mesh networks 172 created by each railcar 100 in the train consist 102.

The bi-directional PWG 176 manages the train-based mesh network 174 and communicates notifications of events, alarms and alerts from the CMUs 170 installed on individual railcars 100 to the host or control point, such as the locomotive 104, wherein the alerts or event reports may be acted upon via human intervention, or by an automated system. Locomotive 104 may include a user interface for receiving and displaying alert messages generated by train-based mesh network 174 or any of the individual railcar based mesh networks 172. The PWG 176 is capable of receiving communications such as notifications of events and alerts from the CMUs 170 on individual railcars 100 and can draw inferences about specific aspects of the performance of train consist 102.

Preferably, a distributed complex event processing (DCEP) engine is used, which is a hierarchical system for collecting and analyzing the data and for communicating data, events and alerts to a final destination where they can be acted upon. The DCEP is responsible for implementing the intelligence used to draw conclusions based on the data collected from WSNs 128, CMUs 170 and PWGs 176. Preferably, the data processing platform is distributed among all WSNs 128. CMUs 170 and the PWG 176 on the locomotive 104, as well as utilizing a cloud-based infrastructure optimized to work closely with train-based mesh networks 172, in conjunction with a variety of data streams from third-party providers or external sources.

If an alert or event condition is detected by a WSN 128 or other sensor, such as when the status of the discharge gate 106 changes from open to close or close to open, or the train moves outside the geofence where it is safe to open the discharge gate, as described in more detail below, the WSN 128 forwards a message to the CMU 170 within its network 172 for further analysis and action, for example, to confirm or coordinate alerts or event conditions reported by one WSN 128 with other WSNs 128 in the railcar based network 172. If an event requiring notification is confirmed by CMU 170, a notification of the event is sent to the PWG 176 installed on an asset such as the locomotive 104, and/or off train to a monitoring and remote railroad operations center 178.

As noted, the CMU 170 on each railcar 100 supports the motion detector sensor 166, such as an accelerometer, and the location sensor 168, such as a GNSS. These sensors are preferably internal (built in) to the CMU 170, but optionally could be external such as in a WSN. Information from these sensors 166, 168 can be used to determine whether WSNs 128 should be looking for certain types of events. Additionally, the CMU 128 can receive instructions, e.g., from an off train site such as operations center 178 through the PWG 176, to start or stop looking for certain types of events or provide a status update. Additionally, CMU 170 on each railcar 100 is capable of using built-in sensors and/or managing a railcar based mesh network 172 on the railcar 100 to generate messages that need to be sent to a host or control point, such as a locomotive 104. Coordinates for geofence areas for use by the CMUs 170 can be programmed into the CMUs 170 and/or obtained via communications and updates from the remote railroad operations center 178 or other sources.

The bi-directional PWG 176 is capable of exchanging information with an external remote railroad operations center 178, data system 192 or other train management systems. This communication path 190 is shown in FIG. 3, and can include cellular, LAN, Wi-Fi, Bluetooth, satellite, or other means of communications. This link can be used to send notifications of events and alarms off-train when the train consist 102 is in operation. This link can also be used to send instructions and information from the remote railroad operations center 178 or other off train source to the individual railcar CMU 170s, such as updated geofence coordinates to be used by the CMUs 170 when determining if a discharge gate related event has occurred.

It is appreciated that a railcar 100 can be decoupled from the train consist 102, for example, at a rail yard where commodity may be loaded or discharged. When decoupled, the railcar 100 is no longer part of the train-based network 174. In such situations, the CMU 170 and its associated WSNs 128 can become part of a rail yard-based mesh network 180 having one or more land-based PWGs 182. The land-based PWGs 182 would interface with the CMU 170 and its WSNs 128 via bi-directional communications network 180 in a similar manner as would the train-based PWG 176 as described above, and provide bi-directional communications between the CMU 170 and off train sources such as the remote railroad operations center 178 via communication path 190 in a similar manner as would the train based PWG 176 as described above, and as illustrated in FIG. 3. A description of a railcar 100 having a railcar based mesh network incorporated into a rail yard-based mesh network 180 can be found in US patent publication 2016/0272228 published Sep. 22, 2016, the disclosure of which is incorporated herein by reference in its entirety.

Event Detection and Notification

In this preferred embodiment, an operational status of the discharge gate on the railcar is based upon the criteria of 1) discharge gate 106 (open or closed), 2) railcar movement (stationary or moving), and 3) location (inside or outside an acceptable area to open the discharge gate 106). When any of the criteria change state, an event takes place that may trigger an action such as the notification of an alert or the cancellation of an alert.

A notification can provide information for inter alia, operational, security and customer billing purposes. The notification may include location of the event, time of the event, status of the discharge gate 106, and duration of the open event and alerts.

Figure 15:
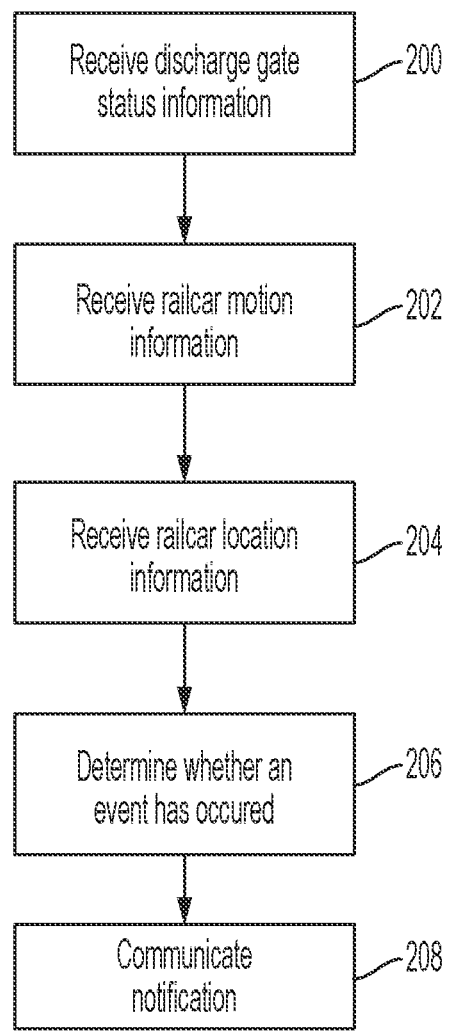
FIG. 15 is a flow chart of an example method according to an embodiment of the invention of collecting data regarding the system related to the discharge gate and for determining the occurrence of an event.

FIG. 15 illustrates an example method of detecting events due to the change in the monitored parameters. As illustrated in FIG. 15, status information pertaining to the discharge gate 106 of a railcar 100 may be received 200. In various embodiment, this discharge gate status information may be detected by one or more WSNs 128 and may be received 200 by the CMU 170 from one or more of the WSNs. The discharge gate status information may include an indication of whether the discharge gate 106 is in an open or closed position, whether a position of the discharge gate has changed from open to closed, and/or whether a position of the discharge gate has changed from closed to open, and may be detected and/or determined as described throughout this disclosure. The CMU 170 may record time and date information of any status changes or when the information was received.

The CMU 170 may receive 202 motion information associated with the railcar 100. As described throughout this disclosure, motion information may be measured by a motion sensor 166 such as, for example, an accelerometer, a GNSS device and/or other types of devices or sensors. Motion information may include data about the acceleration and/or vibration of a railcar 100 at a particular point in time. For instance, if a motion sensor 166 measures any acceleration of a railcar or acceleration that exceeds a threshold value, it may indicate that the railcar 100 is moving. Alternatively, if a motion sensor 166 does not measure acceleration of railcar 100, or an acceleration value that does not exceed a threshold value, it may indicate that a railcar is stationary. The CMU 170 may record time and date information of any status changes or when the information was received.

The CMU 170 may receive 204 location information associated with the railcar 100. The location information may include an indication of whether the railcar is located inside or outside a geofence where it is acceptable or not for the discharge gate to be open. As described throughout this disclosure, location information may be received 204 from a location sensor 168 such as a GNSS. The geofence information may be programmed into the CMU 170 or uploaded and updated from a remote railroad operations center 178 through the networks discussed above. The CMU 170 may record time and date information of any status changes or when the information was received.

As illustrated in FIG. 15, the CMU 170 may determine 206 whether one or more events have occurred. The CMU 170 may determine 206 whether one or more events have occurred based on the status information pertaining to the discharge gate 106, the railcar motion information and/or the railcar location information. A change in any one of these may trigger the determination 206. This determination may also include whether or not alerts or other information should be communicated.

In various embodiments, in response to determining that one or more events have occurred, the CMU 170 may communicate 208 a notification of the event(s), such as an alert, to a remote receiver off the railcar 100 such as, for example a PWG 176 located on a locomotive 104 of the consist 102 or a PWG 182 in a rail yard. This communication may be forwarded further off train or out of the rail yard such as to a remote railroad operations center 178. The term notification can include any information such as alarms, alerts, event details, and data communicated by the CMU for the purpose of notifying persons or other systems of the information.

In summary and as part of the receive discharge gate 106 information step 200, each WSN 128 is capable of analyzing the data collected from its sensors in determining if an event or alert message, as well as the data, should be uploaded to the next higher level in the hierarchy, in this case the CMU 170. Each WSN 128 can be programmed with multiple thresholds for position change readings associated with the discharge gate 106 operating levers 108a, 108b received from one or more of its sensors. When the discharge gate status changes and readings are recorded, it is an indication of a possible notification event or alert condition, and a message is generated and sent to the CMU 170 in the same railcar based mesh network 172.

The WSNs 128 are programmed with thresholds that indicate specific types of alerts or events. For the WSNs 128 mounted on the discharge gate 106, these units may generate a possible open message or a close message depending upon the status change observed. Examples of messages generated are gate "open" and gate "closed". The WSNs 128 may not determine if each of the possible conditions actually exists. This determination is made preferably at the next level up of the hierarchy, at CMU 170, which utilizes the readings from other type of sensors such as railcar location 168 and motion sensors 166 to make a determination that an actual event has occurred. As one of ordinary skill in the art would recognize, different thresholds suggesting the occurrence of other types of events may be programmed into the various sensors.

In regard to the receive information steps 202 and 204 of FIG. 15, each railcar 100 will have sensors for determining railcar movement (166) and railcar location (168). When status changes and readings are recorded for motion and location, it is an indication of a possible event or alert condition to be analyzed by the CMU 170 (and communicated to the CMU 170 if such sensors are located separate from the CMU 170).

The logic carried out by the CMU 170 for determining whether an event has occurred 206, is capable of analyzing both open and close events received from each of the WSNs 128 under its control and determining if an event condition or alarm actually exists. In the illustrated embodiment, the open and close events are independent for each WSN 128 installed near an operating shaft, and the CMU 170 may be configured to either analyze only open or close events, to analyze only other types of events or to analyze open or close events and other types of events. Thus the CMU 170, and WSNs 128 under its control, form a distributed event processing engine that is capable of determining various types of events.

When the CMU 170 determines that an event has occurred which necessitates a notification such as an alert/alarm or other information, a notification (e.g., message) is sent 208 to the next level in the hierarchy such as the PWG 176 located elsewhere on train consist 102, and possibly further up the hierarchy to a remote railroad operation center 178, depending upon the severity of the event and the need to immediately address it, perhaps by altering the operating condition of the train consist 102. The term "notification event" as used herein refers to an event for which a notification, such as an alarm, alert or other information about the event is to be communicated. The notification event is communicated immediately or at some future time depending on the urgency and/or criticalness of the event.

A logic table showing a preferred set of operational status event determinations based on the data collected is provided below. Again, in the illustrated embodiment, the operational status events are determined based on the three criteria of 1) discharge gate status (open or closed), 2) railcar motion (moving or not) and 3) railcar location (in or not in an area where an open discharge gate is acceptable).

For this table, the status of all discharge gates 106 are sampled prior to railcar 100 departure from where it was loaded with commodity. In addition, alerts or alarms are assigned a priority, such as high, medium and low.

FIGS. 8, 9, and 10 are charts of the table below, which describe a variety of discharge gate-related events and associated alerts/alarms that can be provided immediately. The charts also show for each operational status the change in the discharge gate, railcar motion or railcar location (geofence) status that triggered the determination of the operational status, the triggering change being shown by an arrow.

Terminology as used in the table and charts:
a. Operational Status—condition of the discharge gate, railcar motion and railcar location after a change to one or more of these monitored parameters;
b. Event/Alert/Alarm—a possible activity responsible for the Operational Status and the Alerts or Alarms or other notification to be generated.
c. Typical event—a typical operating event during the supply chain cycle;
d. Non-typical event—an event that normally should not happen in normal operating conditions of the supply chain;
e. Alarm—a non-typical event that needs to be acted on immediately;
f. Status Change—when operations change in the supply chain but no notifications are necessary;
g. Geofence—a virtual geographic area where it is acceptable for a discharge gate to be open.

| Operational Status | Status Of The Discharge Gate, Railcar Motion, And Railcar Location | Event/Alert/Alarm |
|---|---|---|
| 1 | Gate valve has changed from open to close, railcar is stationary and is located outside a geofence. | Alarm - End security event, also possible undefined geofence for unloading or sampling event |
| 2 | Gate valve has changed from open to close, railcar is moving and is located outside a geofence. | Non- Typical Event - Unsecured gate chatter |
| 3 | Gate valve has changed from open to close, railcar is stationary and is located inside an unloading, maintenance, railcar wash, or Generic geofence. | Typical Event - End unloading in unloading, or maintenance, railcar wash, or Generic geofence event |
| 4 | Gate valve has changed from open to close, railcar is moving and is located inside a geofence. | Non- Typical Event - Unsecured gate chatter event |
| 5 | Gate valve has changed from closed to open, railcar is stationary and is located outside a geofence. | Alarm - Security alert, also possible undefined (not yet programmed) geofence for unloading or sampling event |
| 6 | Gate valve has changed from closed to open, railcar is moving and is located outside a geofence. | Alarm - Security alert/ unsecured gate |
| 7 | Gate valve has changed from closed to open, railcar is stationary and is located inside a geofence. | Typical Event - Begin unloading event or Product sampling, or maintenance, railcar wash, or Generic event. (these 5 events are defined by geofence type where the event takes place) |

-continued

| Operational Status | Status Of The Discharge Gate, Railcar Motion, And Railcar Location | Event/Alert/Alarm |
|---|---|---|
| 8 | Gate valve has changed from closed to open, railcar is moving and is located inside a geofence. | Non-Typical Event - Unsecured gate chatter event |
| 9 | Railcar motion has changed from moving to stationary, gate is closed and railcar is located outside a geofence. | Status Change - Stopping event |
| 10 | Railcar motion has changed from stationary to moving, gate is closed and railcar is located outside a geofence. | Status Change - Moving event |
| 11 | Railcar motion has changed from moving to stationary, gate is closed and railcar is located inside a geofence. | Status Change - Stopping event in geofence (plant) |
| 12 | Railcar motion has changed from stationary to moving, gate is closed, and railcar is located inside a geofence. | Status Change - Moving event in geofence (plant) |
| 13 | Railcar motion has changed from moving to stationary, gate is open and railcar is located outside a geofence. | Status Change -Still in Alarm condition - Stopping event |
| 14 | Railcar motion has changed from stationary to moving, gate is open and railcar is located outside a geofence. | Status Change -Still in Alarm condition - Moving event |
| 15 | Railcar motion has changed from moving to stationary, gate is open and railcar is located inside a geofence. | Status Change -Still in Alarm condition - change in movement status after unloading event, sample event, or wash, or maintenance, or generic event. Also non-typical - Stopping event in geofence (plant) |
| 16 | Railcar motion has changed from stationary to moving, gate is open and railcar is located inside a geofence. | Alarm - Railcar movement status change after unloading event, sample event, or wash, or maintenance, or generic event. |
| 17 | Railcar location has changed from inside a geofence to outside a geofence, railcar is stationary and gate is closed | Not-logically possible. Conflicting event |
| 18 | Railcar location has changed from inside a geofence to outside a geofence, railcar is moving and gate is closed. | Typical Event - Geofence exit event |
| 19 | Railcar location has changed from outside a geofence to inside a geofence, railcar is stationary and gate is closed. | Not-logically possible. Conflicting event |
| 20 | Railcar location has changed from outside a geofence to inside a geofence, railcar is moving and gate is closed. | Typical Event - Geofence entry event |
| 21 | Railcar location has changed from inside a geofence to outside a geofence, railcar is stationary and gate is open. | Not-logically possible. Conflicting event |
| 22 | Railcar location has changed from inside a geofence to outside a geofence, railcar is moving and gate is open. | Alarm - Geofence exit with gate unsecured. Give alert. |
| 23 | Railcar location has changed from outside a geofence to inside a geofence, railcar is stationary and gate is open. | Not-logically possible. Conflicting event |
| 24 | Railcar location has changed from outside a geofence to inside a geofence, railcar is moving and gate is open. | Status Change -Still in Alarm condition - Geofence entry with gate unsecured |

The events, alarms and other indication in the above table are based on data collected preferably by individual sensors and may not require any analysis other than the exceeding of a predetermined threshold (e.g., proximity of the magnet 138 to the WSNs 128). For example, a WSN 128 indicates a discharge gate open or closed event, which is transmitted to the CMU 170. The CMU 170 will complete an analysis using the railcar motion and location data.

For example, in the table above and in FIG. 8. "Operational Status 5" indicates that a discharge gate valve 106 has changed from closed to open, the railcar 110 is stationary and is located outside a geofence. In this Operational Status 5, the discharge gate 106 is open outside of a geofence, which is not a common operating practice. It could indicate a failure to close the discharge gate 106 prior to departure from a rail yard. It could also indicate unauthorized access to the gate 106, such as in a theft. A high priority Alarm is transmitted.

For example. FIG. 8. Operational Status 6 indicates a discharge gate valve 106 has changed from closed to open, the railcar 100 is moving and is located outside a geofence. An open discharge gate 106 when a railcar 100 is moving and is located outside a geofence is regarded as a high priority type of event that requires an Alarm. When a railcar 100 begins to move, a WSN 128 samples the status of the discharge gate 106 to determine if the discharge gate 106 is in an open position. If the WSN 128 determines that the discharge gate 106 is open and the railcar 100 is moving, it then samples to determine where a railcar 100 is located in relation to a geofence. The CMU 170 starts a processing timer and immediately transmits an open discharge gate 100 notification to the PWG 176 or a remote operations center 178. If additional WSNs 128 generate an open discharge gate 106 event, the CMU 170 will raise the alert level to the highest level and transmit to a PWG and/or a remote operations center such as center 178 or servers 192. It is understood that the notification sent by the CMU 170 to the PWG 176 can be forwarded off train through a PWG 176, 182, or in some cases, the CMU 170 can communicate directly off train through a communication network 192 as seen in FIG. 3. An open discharge gate 106 on a moving railcar 100 may indicate a lapse in operational procedures or may indicate a discharge gate 106 was opened at a point in time by an authorized person and the discharge gate was not closed properly. The consequence of an open discharge gate 106 outside of a geofence is a potential loss of the contents of that particular hopper car.

For example, in FIG. 8. "Operational Status 7" indicates a discharge gate 106 has changed from closed to open, the railcar 100 is not moving and is located inside a geofence. In this illustration, the railcar 100 is known to be in a location where opening of a discharge gate is acceptable, such as in a factory rail yard. The priority of this status event is given a lower priority than those described in other status levels. The event message generated can indicate the beginning of product unloading or if the duration of the open discharge gate state is within a predetermined period of time followed by a closed discharge gate state then a "Product sampling" event is transmitted. A standard operating practice is for product in a hopper car 100 to be sampled prior to the beginning of an unloading process, For example, in FIG. 8 "Operational Status 8" indicates a discharge gate 106 has changed from closed to open, the railcar 100 is moving and is located inside a geofence. In this illustration, the railcar 100 is in a location where an open discharge gate is acceptable, such as in a factory rail yard. The result of the railcar 100 moving with an open discharge gate 106 will cause "gate chatter", therefore an "Unsecured Gate Chatter" event notification will be transmitted. The priority of this status event is given a lower priority than those described in other Status levels.

FIG. 9, based on the above table, illustrates the types of events triggered when railcar motion changes from moving to stationary or stationary to moving.

FIG. 10, based on the above table, illustrates the types of events triggered when a railcar 100 moves from inside a geofence to outside or move from outside a geofence to inside a geofence.

It is appreciated that the operational status and the associated event to be determined may be different depending on the change in the particular parameters being sensed. For example, with reference to FIGS. 8, 9 and 10, operational statuses 2, 10 and 18 all have the same gate status (closed), railcar motion (moving) and location (outside a geofence). Nevertheless, the operational status and events are different for all three based on the change that triggered the determination. In operational status 2, the gate changed from open to closed, in status 10 the railcar motion changed from stationary to moving, and in status 18 the geofence changed from inside to outside.

The proceeding events are all events that are detected by the sensors on the discharge gate 106 indicating if the discharge gate is open or closed (e.g., WSNs 128), the motion detector 166 (e.g., accelerometer), and location sensor 168 (e.g., GPS). A change in the status of any one of these causes the CMU 170 to determine the event and if an alarm/alert is warranted. Similarly, a status inquiry can be requested from off train through the communication network 190 and the PWG as to the current status, for which the data is collected and the event determined as indicated above and then communicated back.

The alarm/alert algorithms include rules to include, but are not limited to, common operating practices related to discharge gate 106 operation inside a factory rail yard, when transiting between origin and destination and the operation of hopper cars 100.

CMU 170 preferably detects long term trends and keeps data regarding trends in the analysis of the gate activity. The total number of valid open and close reading statistics can be collected for every operating shaft being monitored by a WSN 128 in the railcar based mesh network 172.

The collected statistics may be used to calculate information that indicates discharge gate 106 activity trends. In a preferred embodiment, a CMU 170 provides a report upon request of the following quantities for every operating lever 108*a*. 108*b*:

Average, minimum, maximum, standard deviation for times an operating lever 108*a*, 108*b* was moved over a period of time.

Average, minimum, maximum, standard deviation for distance an operating lever 108*a*, 108*b* was moved over a period of time.

Average, minimum, maximum, standard deviation for amount of time an operating lever 108*a*. 108*b* was in an open position over a period of time.

Average, minimum, maximum, standard deviation for amount of time an operating lever 108*a*. 108*b* was in a close position over a period of time.

Statistics can be used to improve the operations and cycle times of the commodities and railcars. Identifying time spent at each stage in the supply chain can help identify areas of improvement for decreasing unneeded time at each stage. Examples of stages include: duration of loaded railcar in transit, duration of loaded railcar storage at destination, time of product sampling, duration of unloading event, duration of unloaded railcar at destination, duration of unloaded railcar in transit, duration of railcar at inbound inspection, duration of unloaded railcar at origin, duration of loading event, duration of loaded railcar at origin.

Figure 11:
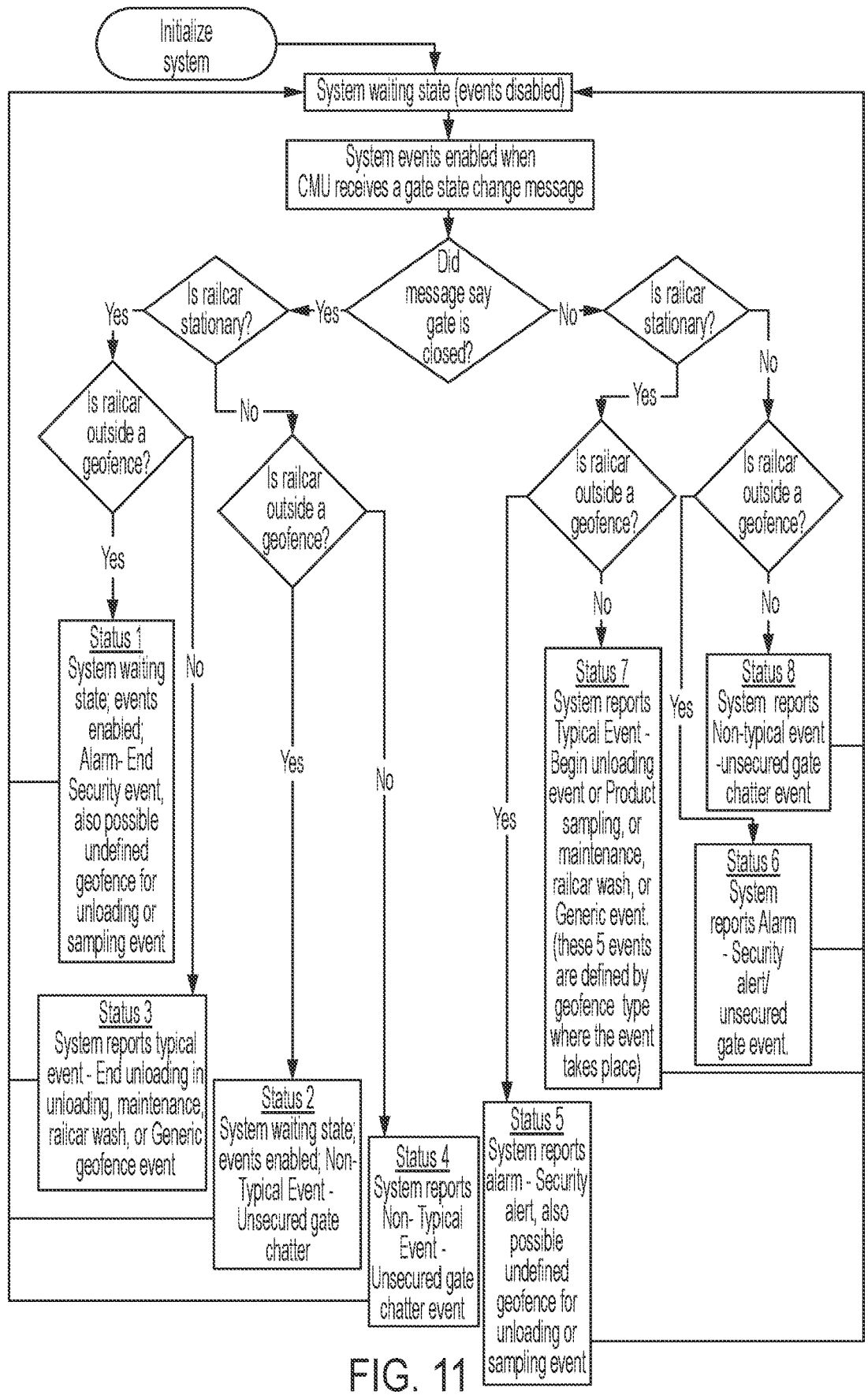
FIG. 11 is a flow chart illustrating a preferred implementation of the data analysis portion by the CMU and WSN based on discharge gate status.
Figure 12:
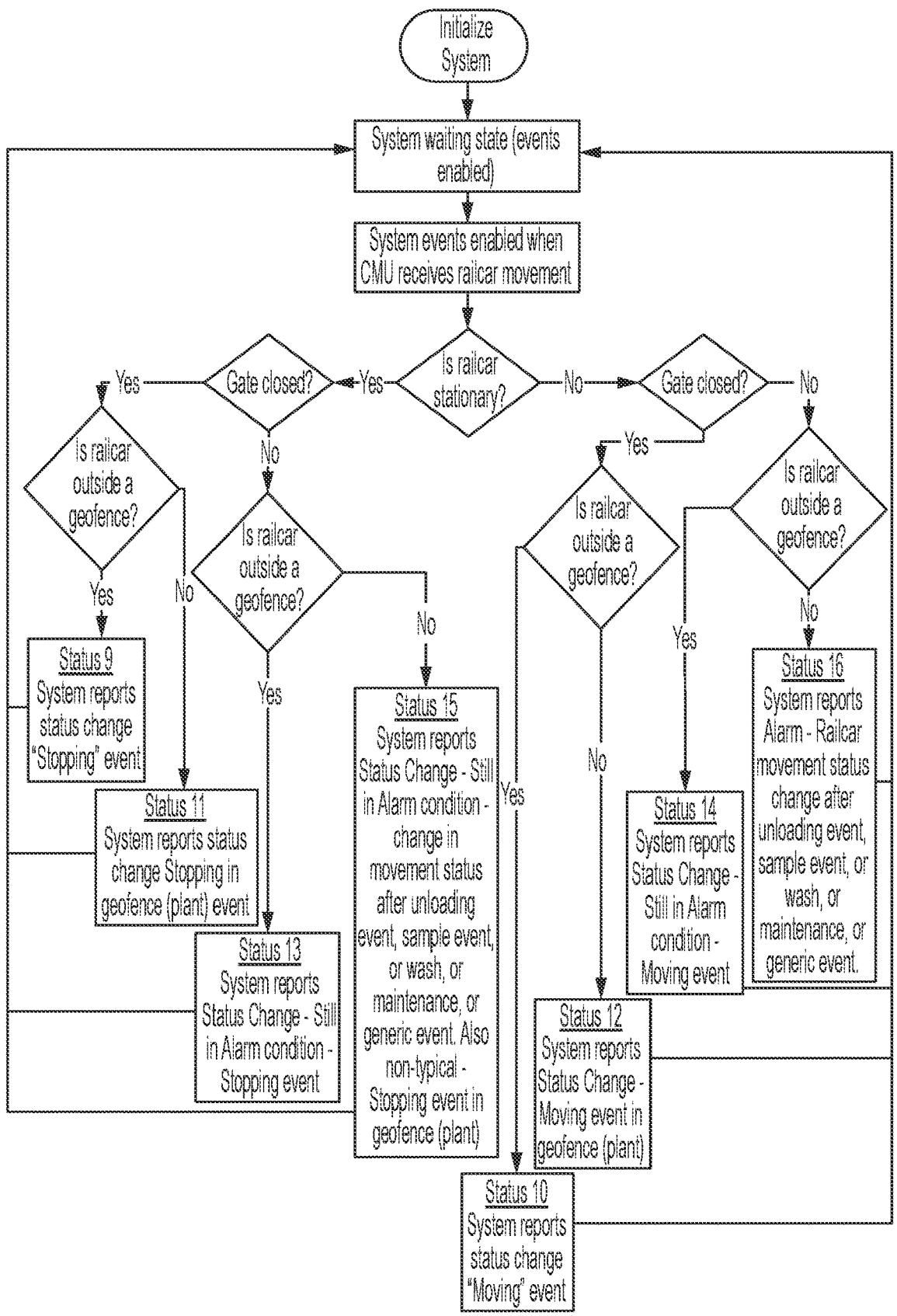
FIG. 12 is a flow chart illustrating a preferred implementation of the data analysis portion by the CMU and WSN based on railcar movement status.
Figure 13:
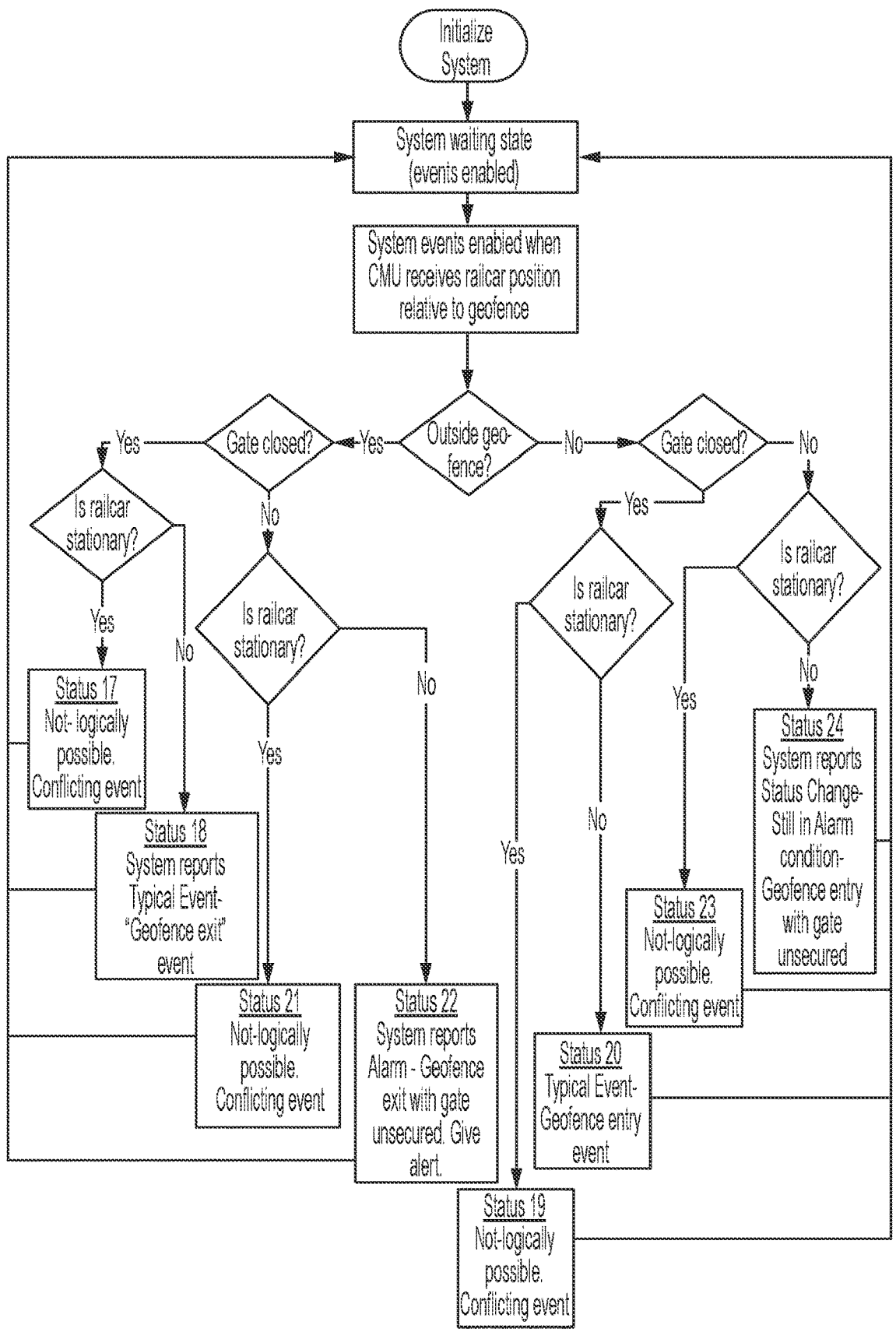
FIG. 13 is a flow chart illustrating a preferred implementation of the data analysis portion by the CMU and WSN based on railcar location relative to a geofence.

With further reference to FIGS. 11, 12 and 13, FIG. 11 is a flow chart illustrating a preferred implementation of the data analysis portion by the CMU 170 and WSNs 128 based on discharge gate status (the figures also use the term "gate" to refer to the discharge gate). FIG. 12 is a flow chart illustrating a preferred implementation of the data analysis portion by the CMU 170 and WSNs 128 based on railcar movement status. FIG. 13 is a flow chart illustrating a preferred implementation of the data analysis portion by the CMU 170 and WSNs 128 based on railcar location relative to a geofence.

Figure 14:
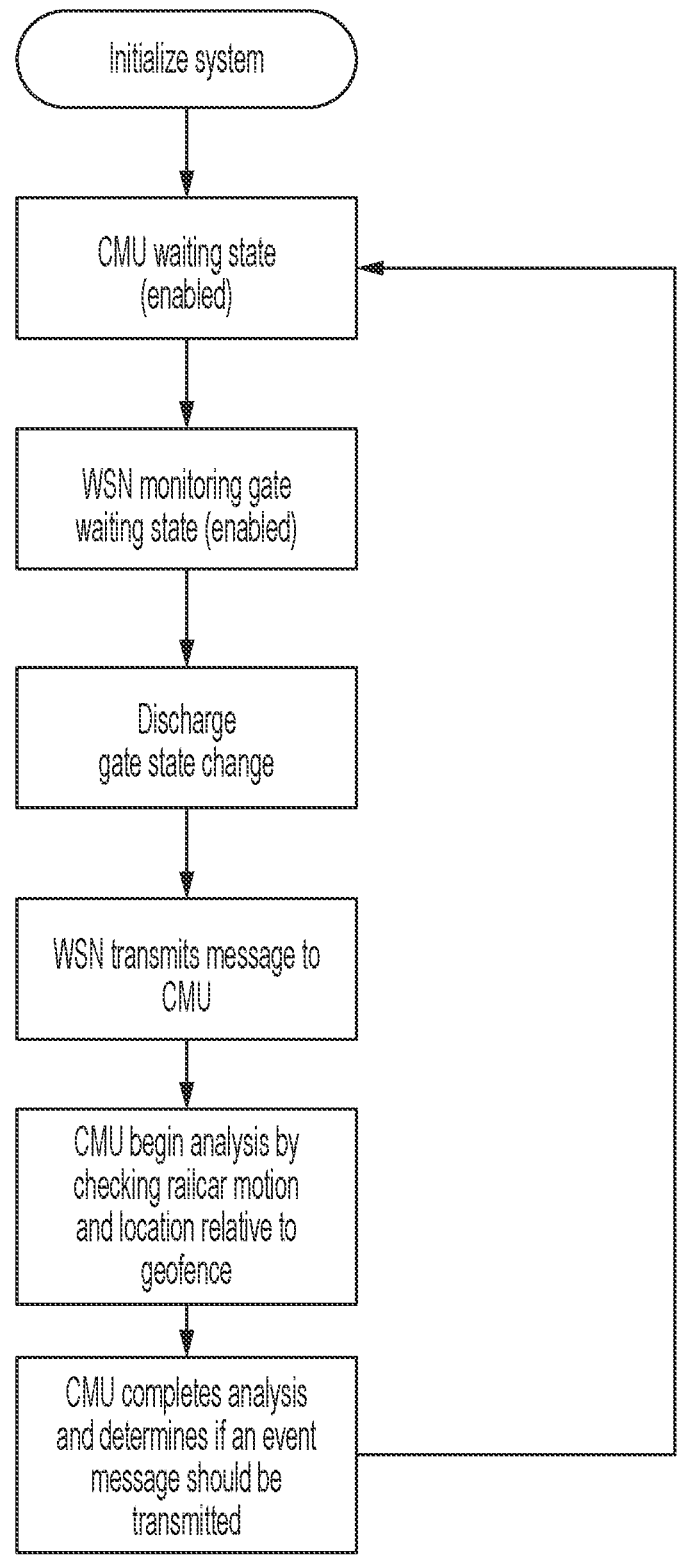
FIG. 14 is a flow chart illustrating a preferred decision making process from the WSN 128 open or close event message to the data analysis of the CMU 170.

FIG. 14 is a flow chart illustrating a preferred decision making process from a WSN 128 open or close event message to the data analysis of the CMU 170.

To summarize, systems, assemblies, and methods have been described for monitoring and detecting events related to the discharge gates 106 of a railcar 100 and the commodity carried by the railcar. The illustrated embodiment carries this out by monitoring 1) the status of the discharge gate 106, which is open or closed, 2) railcar movement, which is stationary or moving, and 3) railcar location—is the railcar in an area, such as a programmed geofence, where it is acceptable for the discharge gate 106 to be open. The CMU 170 collects the data and can make determinations as to whether or not an event has occurred and whether or not such event merits an alarm or other action. Such events are illustrated in the table above and in FIGS. 8, 9 and 10.

The train consist 102 has a train-based mesh network 174 overlaid thereon, and includes the PWG 176 that manages the train-based mesh network 174 and receives alerts from the CMUs 170 on the individual railcars 100.

The PWG 176 is capable of forwarding alarms and other information from the CMUs 170 concerning the discharge gates 106 off train to external remote railroad operations center 178, data systems 192 or other train management systems. Alternatively, the PWG 176 can forward the information to the host or control point, such as the locomotive 104, where the alerts or event reports may be acted upon via human intervention, or by an automated system. Locomotive 104 may include a user interface for receiving and displaying alert messages.

Figure 16:
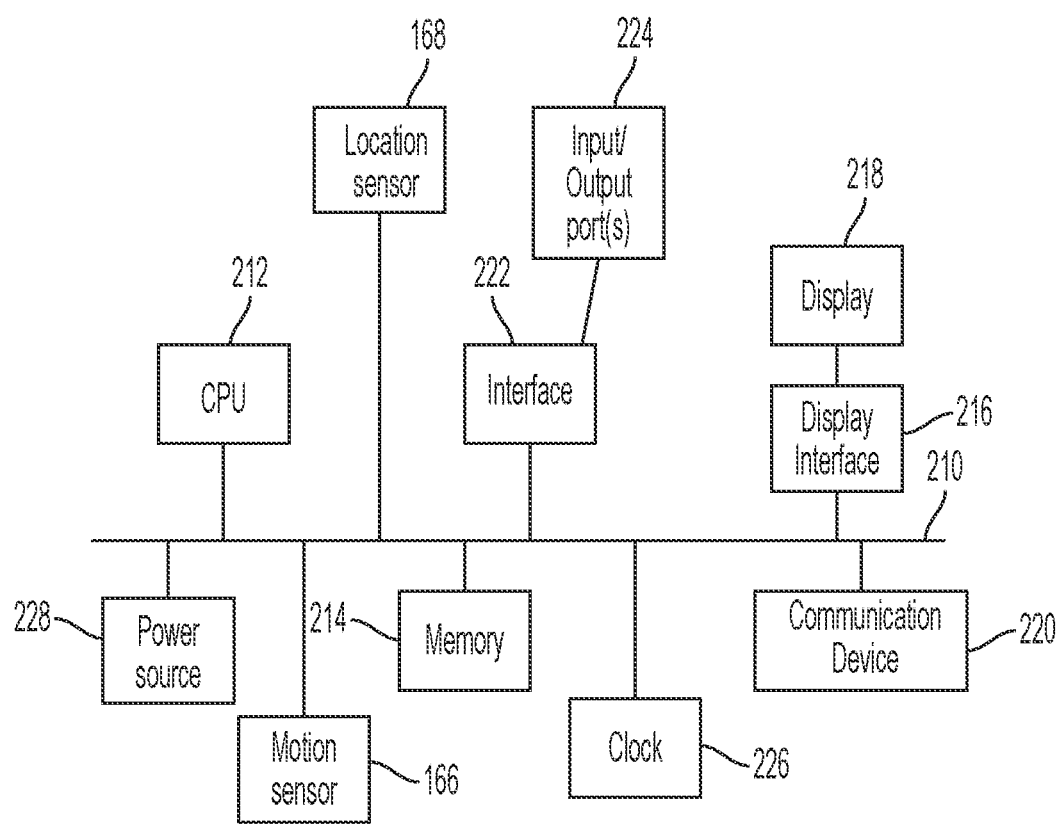
FIG. 16 an example of internal hardware that may be included in any of the electronic components of a system.

FIG. 16 an example of internal hardware that may be included in any of the electronic components of the system, such as, for example, a communication management unit (CMU 170), a powered wireless gateway (PWG 176), or a remote computing device in the system. An electrical bus 210 serves as an information highway interconnecting the other illustrated components of the hardware. Processor 212 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these.

Read only memory (ROM), random access memory (RAM), flash memory, hard drives, and other devices capable of storing electronic data constitute examples of a computer-readable storage medium device 214. The terms "memory," "memory device," "data store," "data storage facility" and the like each refer to a non-transitory device or storage medium on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. Various embodiments of the invention may include a computer-readable storage medium containing programming instructions that are configured to cause one or more processors, or other devices to perform the functions described in the context of the previous figures.

An optional display interface 216 may permit information from the bus 210 to be displayed on a display device 218 in visual, graphic or alphanumeric format. An audio interface and audio output (such as a speaker) also may be provided. Communication with external devices may occur using various communication devices 220 such as a wireless antenna, an RFID tag and/or short-range or near-field communication transceiver, each of which may optionally communicatively connect with other components of the device via one or more communication system. The communication device(s) 220 may be configured to be communicatively connected to a communications network, such as the Internet, a local area network, radio network, satellite or a cellular telephone data network.

The hardware may also include an interface sensor 222 that allows for receipt of data from one or more input ports and/or input devices 224 such as a keyboard, a mouse, a joystick, a touchscreen, a touch pad, a remote control, a pointing device and/or microphone. The interface sensor 222 may allow for provision of data via one or more output ports and/or output devices 224.

The hardware may include a power source 228, such as for example, a battery. The hardware may also include a clock 226 such as, for example, a system clock, a CPU clock and/or the like. The hardware may include a motion sensor 166, such as, for example, an accelerometer. In various embodiments, the hardware may include a location sensor 168, such as, for example, a GPS-enabled device.

It is appreciated that described above are novel systems, devices and methods. It is also understood that the invention is not limited to the embodiments and illustrations described above, and includes the full scope provided by the claims appended hereto. For example, the methods, systems and assemblies discussed above could be applied to the railcar hatches 124 for determining events, alarms, and other information.

What is claimed is:

1. An assembly, comprising;
  a valve attachable to a railway asset through which a commodity can be removed from the railway asset, said valve having one or more operative components that are displaceable when the valve is operated to open and close said valve, and wherein said one or more operative components comprises a rotatable shaft to which a magnet is affixed such that said magnet rotates with said rotatable shaft about a common axis; and
  a sensor configured to be mounted on the railway asset in proximity to said rotatable shaft and configured to sense a position of said magnet, wherein said position is indicative of rotational displacement of said rotatable shaft, thereby indicating whether the valve is open or close.

2. The assembly of claim 1, wherein:
  said one or more operative components further includes at least one lever operable to open and close said valve, and the rotatable shaft being connected to and operable by said lever; and
  said sensor is positioned adjacent to one of said lever and rotatable shaft, and configured to determine the position of said one of said lever and rotatable shaft to determine whether said valve is open or closed.

3. The assembly of claim 1, wherein said rotatable shaft rotates to open and close said valve, and said magnet rotates with the operating shaft to move relative to said sensor.

4. The assembly of claim 1, further comprising a communications management unit positioned on said railway asset and configured to—receive information from the sensor which indicates whether the discharge gate is open or closed.

5. A railway asset, comprising:
- a storage compartment configured to store a commodity;
- a valve coupled to the storage compartment and configured to facilitate removal of the commodity from the storage compartment;
- a rotatable shaft attached to the valve and configured to facilitate an opening and closing of the valve, wherein a magnet is affixed to said rotatable shaft such that said magnet rotates with said rotatable shaft about a common axis; and
- a sensor device coupled to a surface of the storage compartment so as to be mounted in proximity to said rotatable shaft, configured to detect changes in a rotational position of a magnet relative to the sensor device, and configured to determine an open or close status of the valve based on a rotational position of the magnet indicative of rotational displacement of said rotatable shaft.

6. The railway asset of claim 5, wherein the magnet is coupled to the rotatable shaft such that the magnet rotates along with the rotatable shaft in a first direction towards the sensor device and a second direction away from the sensor device.

7. The railway asset of claim 6, wherein the sensor device determines a degree to which the valve is opened based on a magnetic field strength.

8. The railway asset of claim 7, wherein the sensor device comprises a reed switch to detect the magnetic field strength.

9. The railway asset of claim 7, wherein the sensor device determines that the valve is fully open or closed when the magnetic field strength indicates that the magnet is a threshold distance from the sensor device.

10. The railway asset of claim 5, wherein the valve comprises a discharge gate.

* * * * *